Jan. 8, 1963
G. T. RANDOL
3,072,106
BOOSTER-TYPE SERVOMOTOR FOR BRAKE SYSTEMS
Original Filed Sept. 2, 1958
8 Sheets-Sheet 2
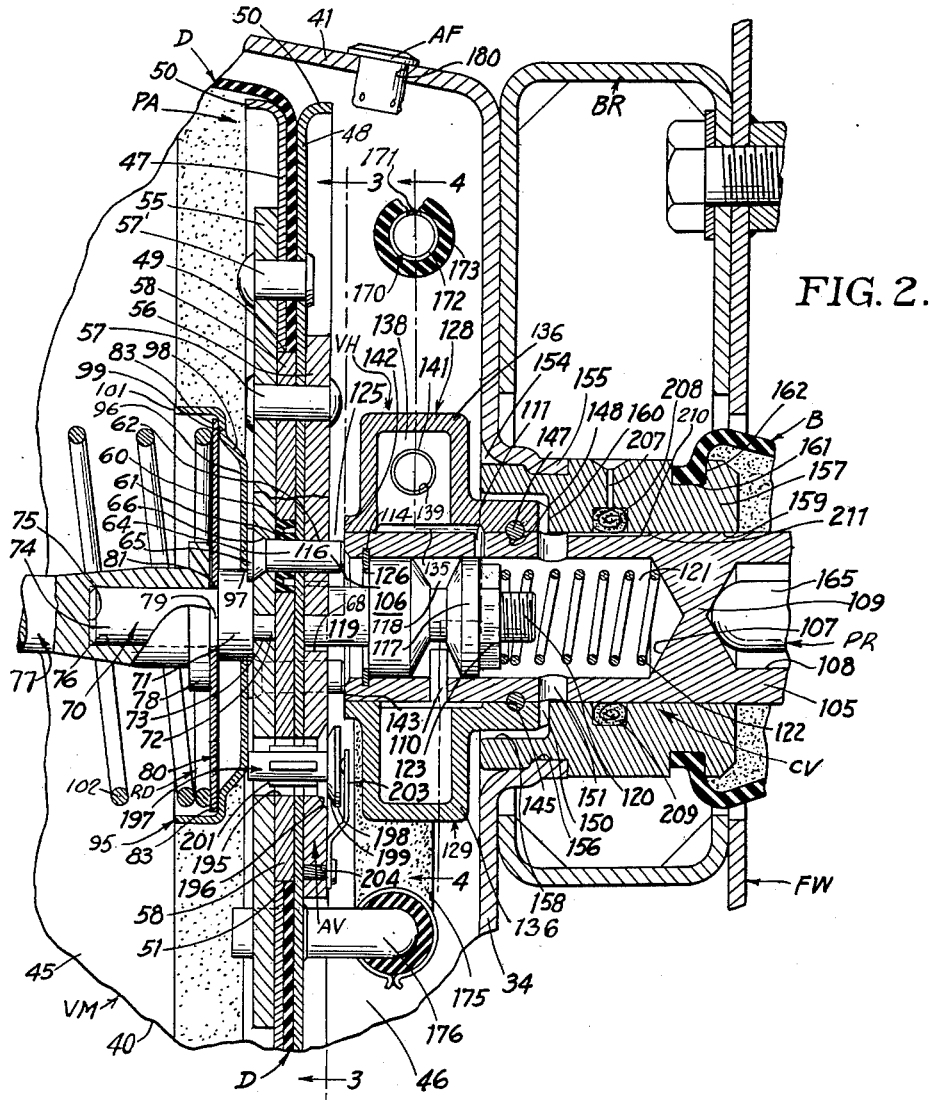
FIG. 2.
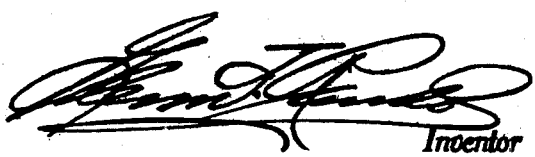
Inventor FIG. 3.
FIG. 5.
FIG. 4.
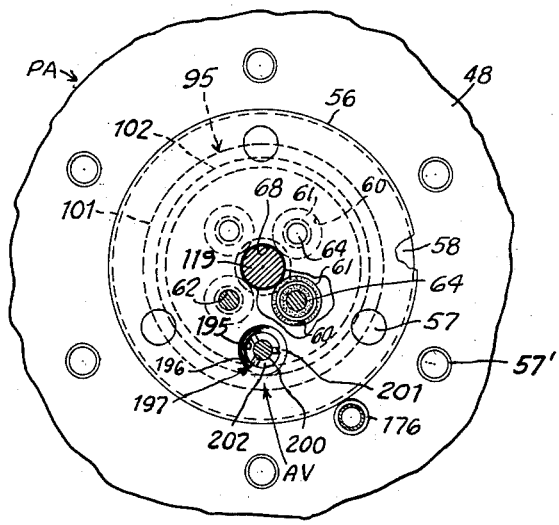
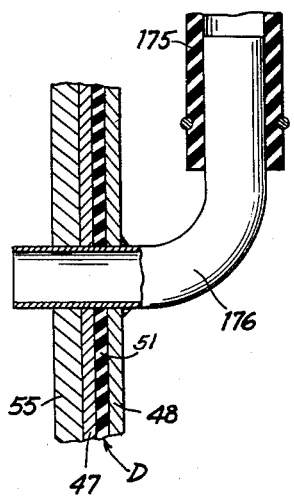
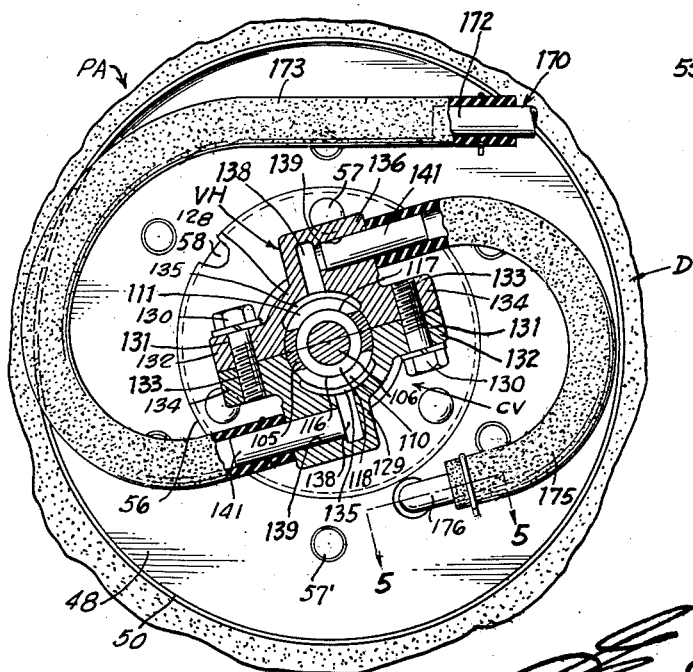

Jan. 8, 1963  G. T. RANDOL  3,072,106
BOOSTER-TYPE SERVOMOTOR FOR BRAKE SYSTEMS
Original Filed Sept. 2, 1958  8 Sheets-Sheet 4

Inventor

Jan. 8, 1963 G. T. RANDOL 3,072,106
BOOSTER-TYPE SERVOMOTOR FOR BRAKE SYSTEMS
Original Filed Sept. 2, 1958 8 Sheets-Sheet 5
FIG. 9.
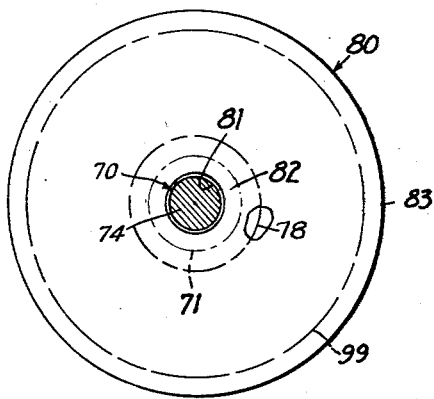
FIG. 9A.
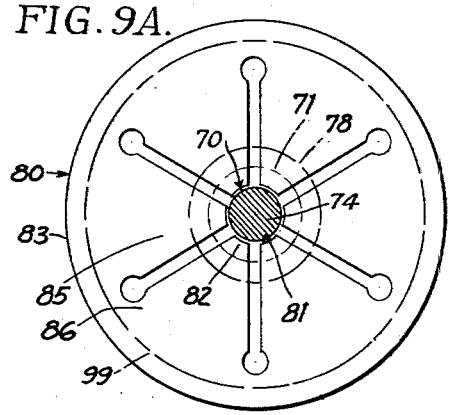
FIG. 9B.
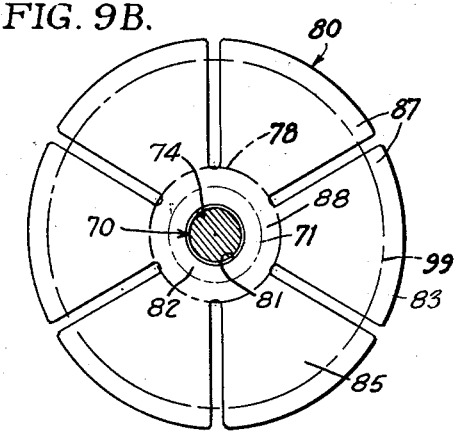
FIG. 9C.
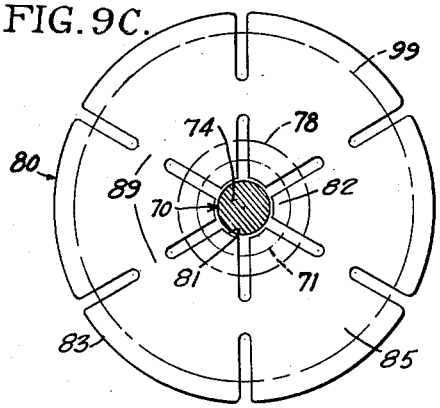
FIG. 9D.
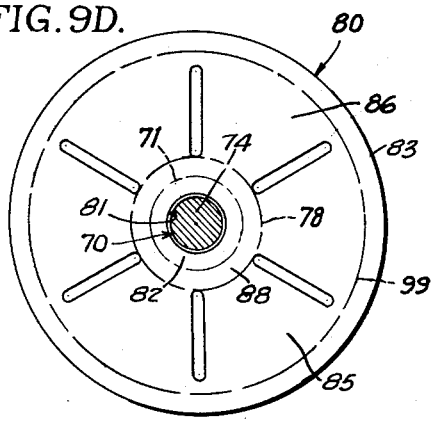
FIG. 9E.
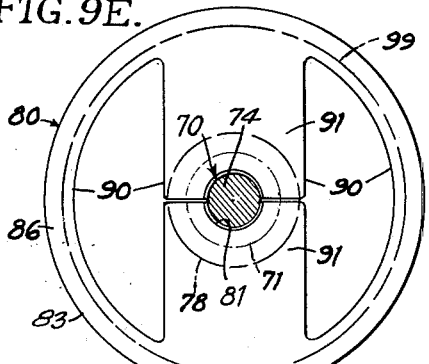
Inventor

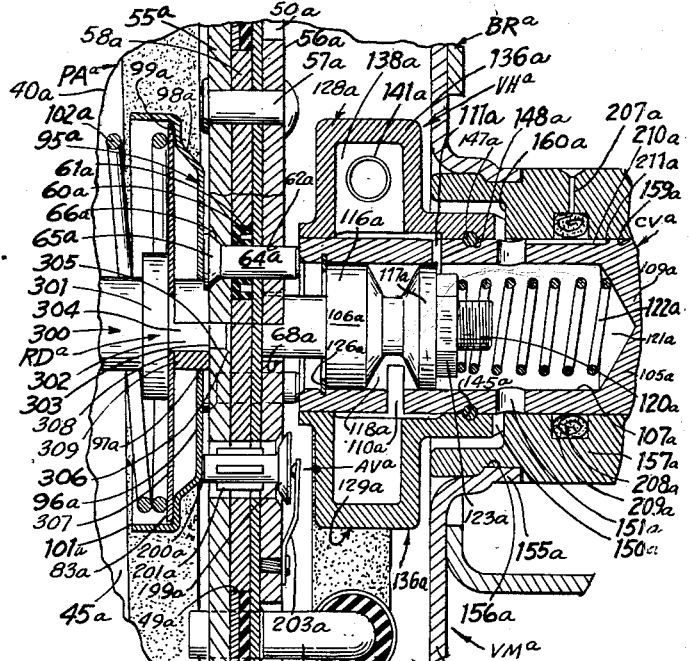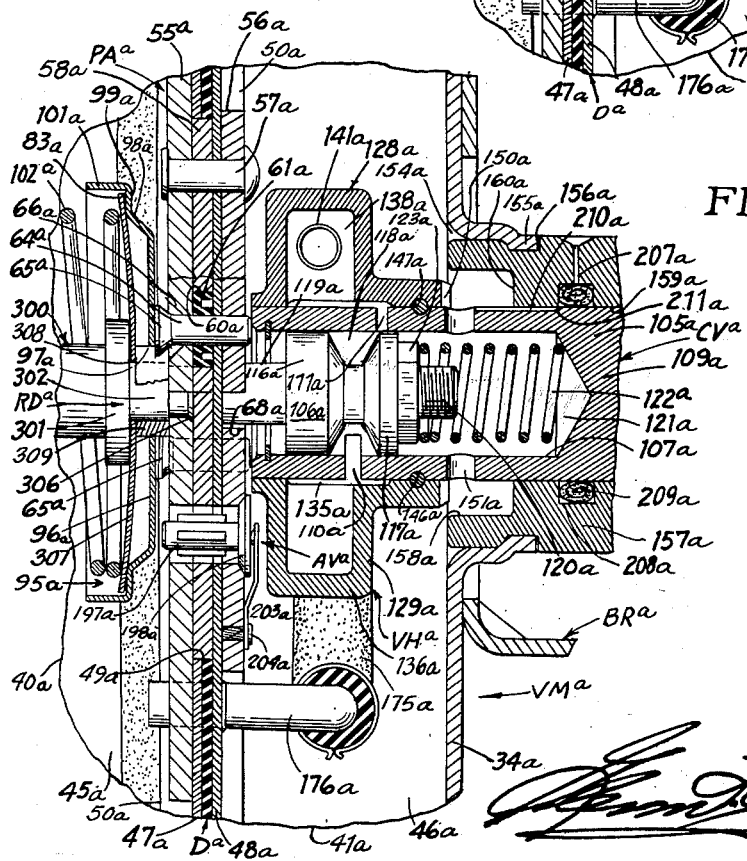

United States Patent Office 3,072,106
Patented Jan. 8, 1963

3,072,106
BOOSTER-TYPE SERVOMOTOR FOR
BRAKE SYSTEMS
Glenn T. Randol, 2nd Ave. and Paull St., P.O. Box 275,
Mountain Lake Park, Md.
Continuation of abandoned application Ser. No. 758,405,
Sept. 2, 1958. This application July 5, 1961, Ser. No.
122,037
22 Claims. (Cl. 121—41)

This application is a continuation of my copending application Serial No. 758,405, filed September 2, 1958, now abandoned.

The present invention relates to booster-type servomotors adapted for use on automotive vehicles and the like, and particularly to a novel and improved servomotor in operative association with the conventional master cylinder of hydraulic brake systems on such vehicles, said invention constituting an improvement on the servomotor disclosed in my earlier application Serial No. 684,946, filed September 19, 1957.

In my copending application referred to, there is disclosed a simple, low-cost and self-contained control valve construction which is movably supported as a unit directly on the casing of the vacuum-power servomotor and independently of the power assembly movable in said casing, whereby rigid coaxial disposition of the power assembly and control valve therefor is eliminated to avoid precision alignment thereof with bearing supports provided on the casing were the control valve and power assembly integrated as in prior art apparatus of this general character. In this manner, numerous machining operations are dispensed with, and the assembly and servicing of the control valve is greatly facilitated, and more economically too, since the power assembly and control valve therefor are separate unitary components permitting either of them to be inspected or serviced independently of the other.

The control valve referred to in the object next above comprises at least two principal cooperating elements disclosed herein as a valve sleeve and a valve piston therein relatively displaceable from normal disposition wherein pressures are balanced on opposite sides of the power assembly for power-inactivation of the servomotor, to operating "on" position to establish differential pressures on opposite sides of the power assembly for power-activation of the servomotor, said control valve preferably including a normally preloaded spring to bias the said valve elements apart to normal disposition, in one embodiment of the invention as will appear.

In my above-identified earlier application Serial No. 684,946, there is also disclosed reaction spring means having a helically formed expansion spring which is normally preloaded to supply reaction to pedal depression as a measure of the total braking force effective at different stations of pedal movement. This reactive spring is operably disposed within the vacuum-power chamber of the motor and encircles a portion of a work-performing element actuated by the power member with one end of said spring bearing on the inside of the front end wall of the power cylinder and the other end reacting on a cup-shaped spring seat relatively slidable with respect to said work element and normally engaging the power member to return it to normal position under influence of said reactive spring, said spring reacting continuously on the control valve element actuated by the brake-pedal whereby depressing the pedal moves this valve element and spring seat simultaneously relatively to another control valve element telescopically associated with the pedal-actuated element and movable in unison with the power member, to isolate the atmosphere from and place the vacuum source in communication with the vacuum-power chamber and thus energize the power member.

In the reduction of this novel spring reaction principle to commercial use, it was found that while this type of reaction provides the operator with highly satisfactory control during initial slack take-up movement of the pedal up to an initially pressurized condition of the brake fluid insufficient to produce a firm braking effect as defined by the thrust-transmitting capacity of the control valve return spring, but at the point where the power phase is introduced to pressurize the brake fluid to render the braking action firmly effective, movement of the power member and associated fluid-displacing parts including the spring seat aforesaid induces a substantially arrested status of said operating components with consequent negation, of further increasing reaction from the reaction spring aforesaid notwithstanding pressure on the brake fluid under influence of the power member continues to build up by virtue of increasing the vacuum opening in the control valve. Consequently, the operator continues to receive the same reaction as was effective at the beginning of the power phase which tended to produce a discernible power-surge on the pedal for lack of increasing reaction from the reactive spring which depends on movement of its spring seat to produce its reactive effect.

A further disadvantage found in the aforesaid reactive spring per se is that a heavily rated spring is required to smooth out the mergence of the power force with initial operator force to prevent possible power-surge at this point in the braking application which increases pedal-load to the extent that such spring reaction alone does not provide the reduced operator force normally associated with power-boosted brakes, and too, since this spring must be under tension in response to pedal movement by the operator, at certain stages of the braking application, a wave-surge effect is transmitted to the operator's foot as the pedal literally "floats" on this spring during the working stroke of the power-booster to pressurize the brake fluid.

It is thus seen from the foregoing discussion of my earlier disclosure Serial No. 684,946 that use of spring action alone as a reactive force on the operator pedal is inadequate through the fluid pressurizing phase of the power-booster, serving only to provide increasing resistance to pedal movement during the slack take-up movement of the pedal to the point of initially actuating the work-load, and thereafter the reactive force from this spring becomes substantially a constant force in relation to power-boost actuation of the work-load, due to substantially stationary condition of the work-performing element under power-booster actuation, and as a consequence, a possible power-surge can occur as the booster force is introduced upon increase of pressure on the pedal.

To overcome the above noted disadvantages and thus provide smoothly increasing resistance on the pedal as the pressure on the brake fluid builds up under influence of the power-booster for predictable brake-control, with such increasing resistance being effective at any given position of the pedal up to the point of power-run-out, the present invention seeks as a primary object to preferably utilize a two-lever mechanical reaction mechanism of new and improved construction and operation between the work element and power member, and which includes a fulcrum block for varying the division of work between the driver and booster unit by changing the height of said block, said work element being capable of direct actuation by said power member, the reaction mechanism comprises said two levers individually offset radically from the axis of the power member, and optionally, said levers may be arranged in an interconnected circular configuration to form a reaction member such as a disc. The individual levers are characterized by rigidity to transmit proportional reaction on said work-performing element to the brake-pedal, while the reaction disc member is characterized by resiliency to provide a progressively increasing reaction on said brake-pedal. The aforesaid reactive spring and the lever reaction mechanism combine to produce a two-stage transferal of reaction to the pedal, the former providing instant opposition to initial pedal movement, while the latter impresses a proportional reactive force from the master cylinder (work-load) via said work element against the pedal, and wherein said reaction levers are ineffective to transmit reaction in their normal disposition, and operable to reaction-transmitting disposition under operator-actuation of said one valve element, operation of said levers to transmitting disposition being effective to axially separate said power member and work performing element to condition said reaction levers to transmit reaction from the master cylinder (work-load) accompanied by relative displacement of the control valve to operating "on" disposition, as a function of the reaction on said work-performing element.

A further salient feature of my invention resides in the provision of new and improved auxiliary or vacuum relief valve means operably incorporated in the power member for venting the vacuum-power chamber to atmosphere via the atmospheric chamber of the booster motor in cooperation with the restricted air-vacuum control opening in the main control valve to enable rapid release of the power member irrespective of the mode of pedal manipulation so that brake release keeps pace with the rate of withdrawal of foot pressure from the pedal.

A modified reaction device installation is provided wherein the lever-action of the resilient diaphragm or disc is eliminated, said disc being constructed similarly to the disc having lever-action but with its marginal portion which encircles its central aperture, fixed on the work-performing element or push-rod actuated by the power member of the vacuum-motor whereby pressure applied to its peripheral marginal portion via the aforesaid spring seat moved by the operator, develops tension in the disc from its normally relaxed status to provide increasing resistance to brake-pedal depression in direct proportion to the distance the pedal is depressed as a measure of the braking force being applied at any given position along the full operating stroke of the pedal, the normally relaxed status of the disc or when subjected to slight tension, performs the function of moving the power-actuated assembly and work-performing element simultaneously in cooperation with the control valve return spring under normal preload until a predetermined reaction becomes effective, at which point, the reaction from the work element becomes substantially constant while the booster motor is energized to actuate said work element to render the work-load provided by the master cylinder effective as required. This initial operation of the work element usually opposed by a normally preloaded spring, is brought about with assistance from the normally preloaded status of the aforesaid return spring normally separating the control valve parts to shut-off the vacuum from the vacuum-power chamber.

A further important object of my invention is to provide such novel reactive disc installed normally relaxed, therefore devoid of tension, or said disc may be optionally installed normally under predetermined tension insufficient to overcome spring-action against the work-performing element, such spring-action serving in part as the return means therefor. This latter arrangement, however, being applicable to the first embodiment only wherein the disc is characterized by combined tension and lever-action for transmitting progressive reaction from the work-performing element to the brake-pedal; but in the disc installation described in the object immediately preceding, the predetermined tension may be varied at will.

Another modification of my invention provides a new and improved lever-reaction system or mechanism which is devoid of resiliency characterizing the aforesaid reaction diaphragm, and which provides reaction on the operator member via the control valve element acted on by said member proportional to the force developed by the vacuum-motor. This novel lever-reaction system replaces the resilient diaphragm or disc employed in either of the embodiments previously described.

An object relating to the object next preceding is the provision of new and improved means for conditioning the reactive-lever mechanism to transmit reaction forces from the work-performing element to the operator member in response to initial movement of the operator member from its normally released position to take up the slack, for example, in the hydraulic brake system to a point of sufficiently pressurizing the brake fluid to render the fluid-displacing unit substantially stationary to induce operative energization of the vacuum-motor.

My invention further provides an optional feature in the way of a novel mechanical connection between the control valve piston and power member of the vacuum-booster whereby the valve piston and power member have axial movement in unison while limited radial movement relatively therebetween is provided to prevent binding and/or wear on the operating parts which could result from possible slight disalignment. Thus, this connection eliminates need for critical tolerances to maintain coaxial exactness between the power member and control valve therefor and, for example, with respect to the piston in a hydraulic master cylinder which constitutes part of the work-load, since the movable assemblies aforesaid are capable of limited lateral displacement with respect to each other without hindering their free axial movement. Another advantage provided by this novel mechanical connection is that the spring utilized to separate the control valve sleeve and piston to normal "off" disposition wherein the vacuum is cut-off from the power chamber, may be eliminated since the control valve element actuated by the brake-pedal is opposed by the reactive helical spring aforesaid, and the other valve element moves in follow-up engaged relationship with the power member opposed by the spring reacting on the work-performing element, and the resilient disc member if the latter is utilized as the reaction member. Accordingly, if the valve element separating spring is eliminated, the servomotor becomes energized to assist in operating the work-performing element as a consequence of the reaction of the spring opposing movement of the work-performing element, while if a valve separating spring is employed of such preloaded magnitude that the spring reacting on the work element can be overcome, then the servomotor becomes energized to assist in operating the work element upon the latter encountering a work-load sufficient to create reaction of such magnitude as to induce the valve separating spring to yield and thereby accommodate relative displacement of the valve elements to operating "on" position for power-activation of the servomotor.

With these and other objects and advantages in view, the invention consists of the new and novel combinations, construction, and arrangement of parts as hereinafter more fully described, set forth in the claims appended hereto, and disclosed in the accompanying drawings forming a part hereof, wherein:

FIGURE 1A is a longitudinal section of a portion of FIGURE 1 showing details of the residual pressure check-valve associated with the discharge port of the master cylinder;

FIGURE 1B is an enlarged sectional view of a portion of FIGURE 1 showing details of the air filter device;

FIGURE 2 is a longitudinal vertical section of a portion of FIGURE 1 on an enlarged scale of the mechanism per se with certain parts shown in elevation;

FIGURE 3 is a transverse sectional view taken on a reduced scale along the line 3—3 of FIGURE 2, and showing details of the novel reaction device associated with the operator-operated means;

FIGURE 4 is another transverse sectional view taken on a reduced scale along the line 4—4 of FIGURE 2, and showing details of the control valve structure and associated flexible conduit connections to the exterior of the vacuum-motor cylinder and to the power chamber thereof via the power member movable in said cylinder;

FIGURE 5 is a fragmentary sectional view taken along the line 5—5 of FIGURE 4 on an enlarged scale and showing details of the air-vacuum fitting mounted on the power member;

FIGURE 9 is a face view on an enlarged scale of the resilient reaction disc per se in the novel reaction device;

Figure 12:
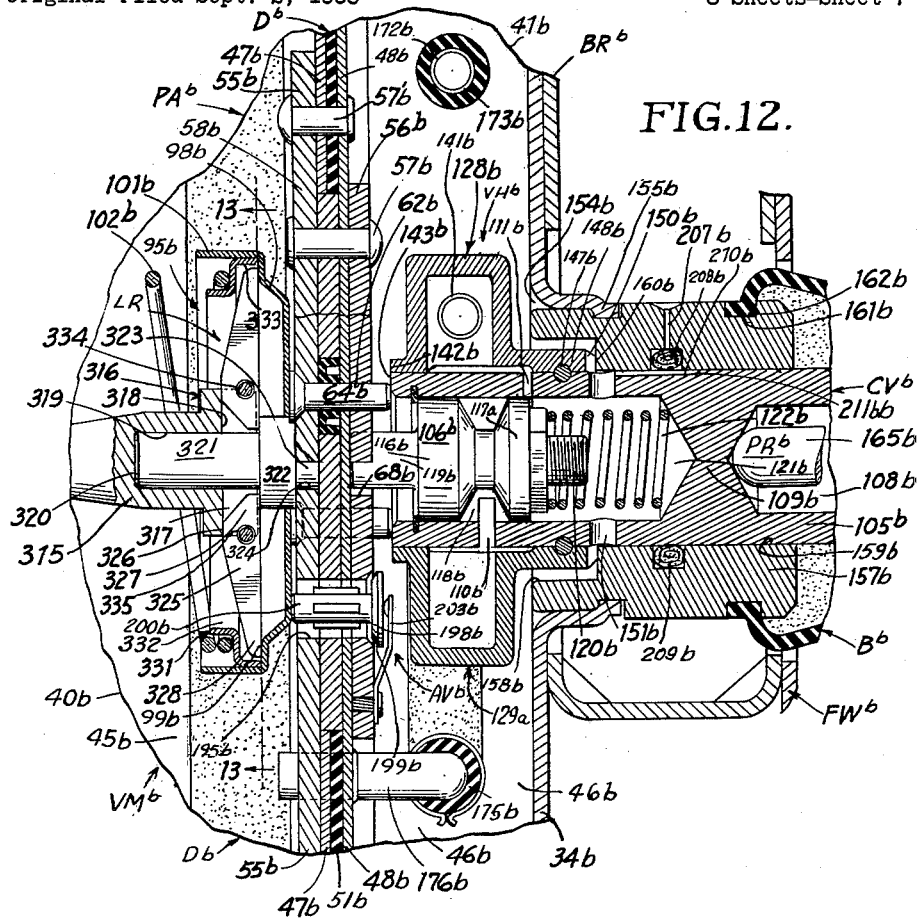
Figure 13:
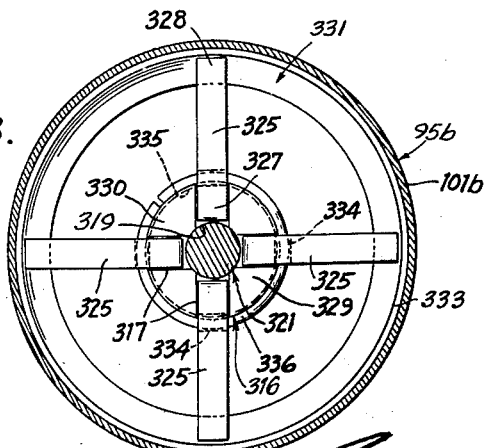
Figure 14:
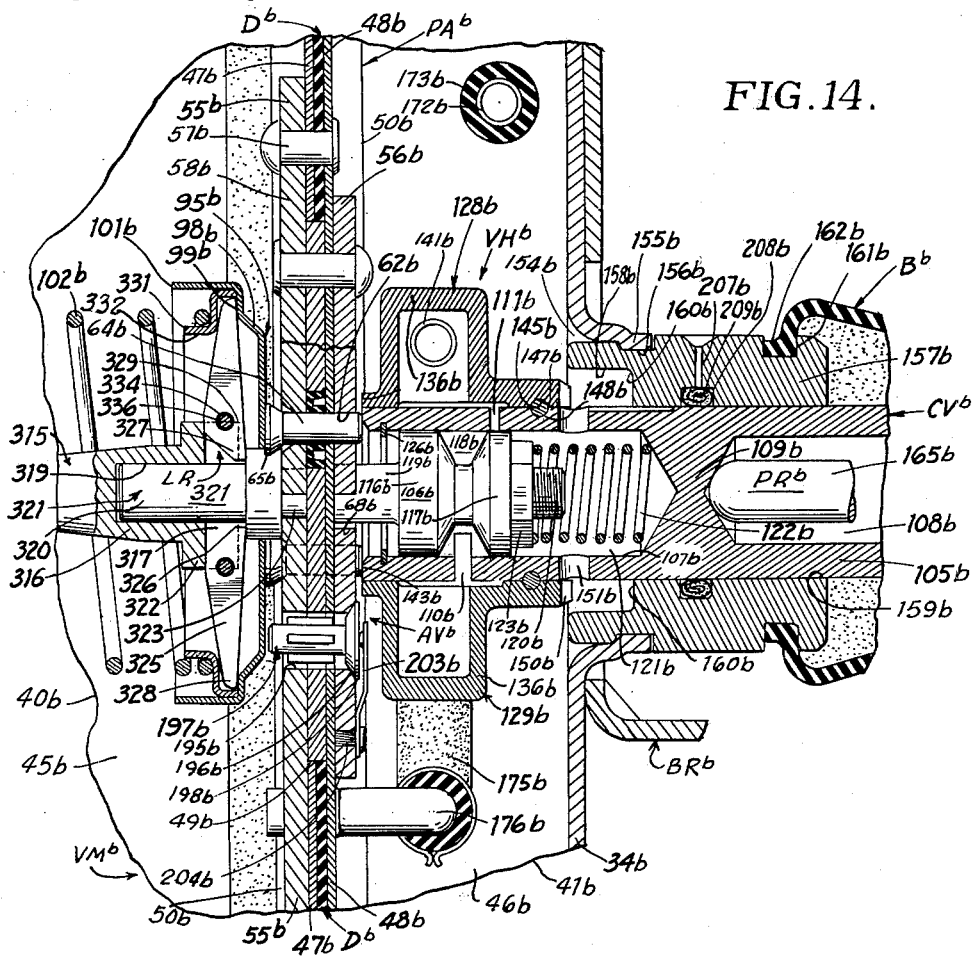
Figure 15:
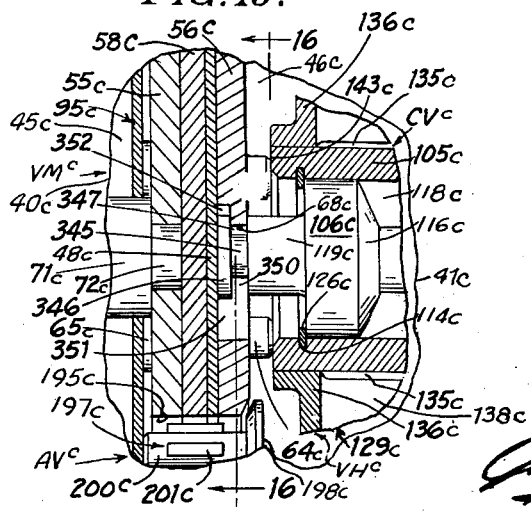
Figure 16:
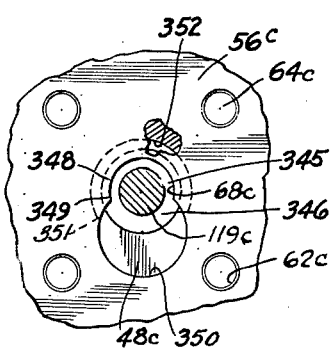

FIGURES 9A, 9B, 9C, 9D, and 9E are variations in the construction of the spring-disc per se illustrated in FIGURE 9;

FIGURE 10 is a longitudinal vertical section of a modified form of the novel reaction device in which the lever-action is eliminated whereby reaction on the operator-operated member is resilient only and in direct proportion to the distance said member is moved from its normal released position;

FIGURE 11 is an operated depiction of the FIGURE 10 modification wherein the power phase is in readiness to be inaugurated;

FIGURE 12 is another modification of my invention shown in longitudinal vertical section wherein a new and novel lever-reaction system or mechanism devoid of resiliency which characterizes the reaction device aforesaid, is depicted and which transmits the force developed by the vacuum-motor proportionally to the operator member via the control valve sleeve;

FIGURE 13 is a transverse sectional view taken along the line 13—13 of FIGURE 12 modification;

FIGURE 14 is an operated depiction of the FIGURE 12 modification wherein the power phase is in readiness to be inaugurated;

FIGURE 15 illustrates a further modification of my invention wherein the control valve piston is mechanically coupled to the vacuum-motor power member for axial movement as a unit, said coupling accommodating relative radial displacement of these two components; and FIGURE 16 is a transverse sectional view of FIGURE 15 taken along the line 16—16 thereof to show further details of the mechanical coupling arrangement between the valve piston and power member.

Like characters of reference designate like parts and assemblies thereof, in the several views with like parts and assemblies in the modified forms of the invention being distinguished, however, by the suffixes "a," "b,' and "c" etc. respectively to each.

Referring now to the drawings, and particularly to FIGURES 1, 2, 3, 4 and 5 my improved booster brake mechanism generally designated BM comprises: a fluid-pressure actuated servomotor or more specifically a vacuum-operated motor or power cylinder generally designated VM, in operative association, for example, with the conventional hydraulic master cylinder MC having an integral end flange 10 for mounting it on end wall 11 of the vacuum-power motor as by an adapter plate 12 secured thereto by a plurality of headed bolts 14, preferably four in number, which project from the inside of the wall 11 through suitable registering holes in said wall and plate respectively, thence through holes 15 in the marginal portions of the flange 10. Lock nuts 16 are threaded onto the bolts to secure the end plate tightly against the vacuum motor end wall to provide a unitary assembly thereof. The headed ends of said bolts are rigidly attached as by pressfit or welding to the inner side of the end wall 11. Sealing gaskets are provided between the faces of the flange 10 and adapter plate and between the latter and the confronting face of the end wall 11 to effect an airtight assembly thereof. The master cylinder MC has the usual fluid-displacing assembly or unit comprising: the spool-type piston 20, residual pressure valve RV and a spring-loaded one-way pressure discharge valve 22 (see FIGURE 1A) associated with the discharge port 23, the latter serving to transmit fluid under pressure from the working chamber 24 into the hydraulic lines and wheel cylinders (not shown) to operate, for example, the wheel brakes (not shown) of a motor vehicle or the like, and a piston return spring 25 is operably disposed in the working chamber 24, which also serves to control the residual pressure valve RV. A gravity-type reservoir 26 is disposed above the working chamber and communicates therewith via the compensating and intake ports 27, 28 respectively, and passageways 29 in the head of said piston, to prevent cavitation in the working chamber 24 by maintaining it filled at all times, said piston being equipped with the cup-shaped pliant head seal 31 and the fluid-retaining seal 32 to prevent fluid loss past the piston to the exterior when the latter is actuated to pressurize the fluid in the working chamber. An integral hub portion 33 projects rearwardly from the flange 10 through coaxial openings in the central portions of the adapter plate, gaskets, and end wall 11 of the vacuum motor aforesaid, said hub serving to stabilize the master cylinder MC in coaxial disposition with respect to the vacuum cylinder VM.

The rear or opposite end wall 34 of the vacuum cylinder VM is preferably spaced, for example, from the forward side of the firewall FW of the motor vehicle, the latter serving to support the booster brake mechanism BM in operating position in installations operated by a suspended-type pedal mechanism generally designated P and comprising: a pedal arm 35 pivotally suspended at its upper end on the vehicle at 36, and the lower end of said arm terminates in a foot pad 37 whereby the operator may exert effort on the pedal mechanism P to operate the same. The outer end of a push rod PR is pivotally connected at 38 to an intermediate point on the pedal arm to control the vacuum motor VM as will appear. Attached to the exterior of the rear wall 34 is a bracket generally designated BR for mounting the booster brake mechanism BM on the firewall in spaced relation thereto best demonstrated in FIGURE 1, said bracket being identical in construction and installation to that shown in my earlier U.S. application Serial No. 684,946 and reference may be had to this disclosure for structural details of this bracket.

The vacuum-power cylinder VM is preferably a differential air-pressure operated motor which utilizes either vacuum or super-atmospheric pressure to create the differential pressures across the movable power assembly PA aforesaid to operatively energize the same. In ordinary automotive installations, a vacuum operated motor is preferred to one operated by compressed air since the engine intake-manifold may serve as the vacuum source without power loss from the engine.

The vacuum cylinder comprises: a pair of cylindrical cup-shaped casings (shells) 40, 41 closed at their outer ends by said walls 11, 34 respectively, and having their confronting open ends formed with outturned annular flanges 42, 43 respectively, the latter being provided with a plurality of registering holes 44 therethrough in circumferentially spaced relationship.

Figure 1:
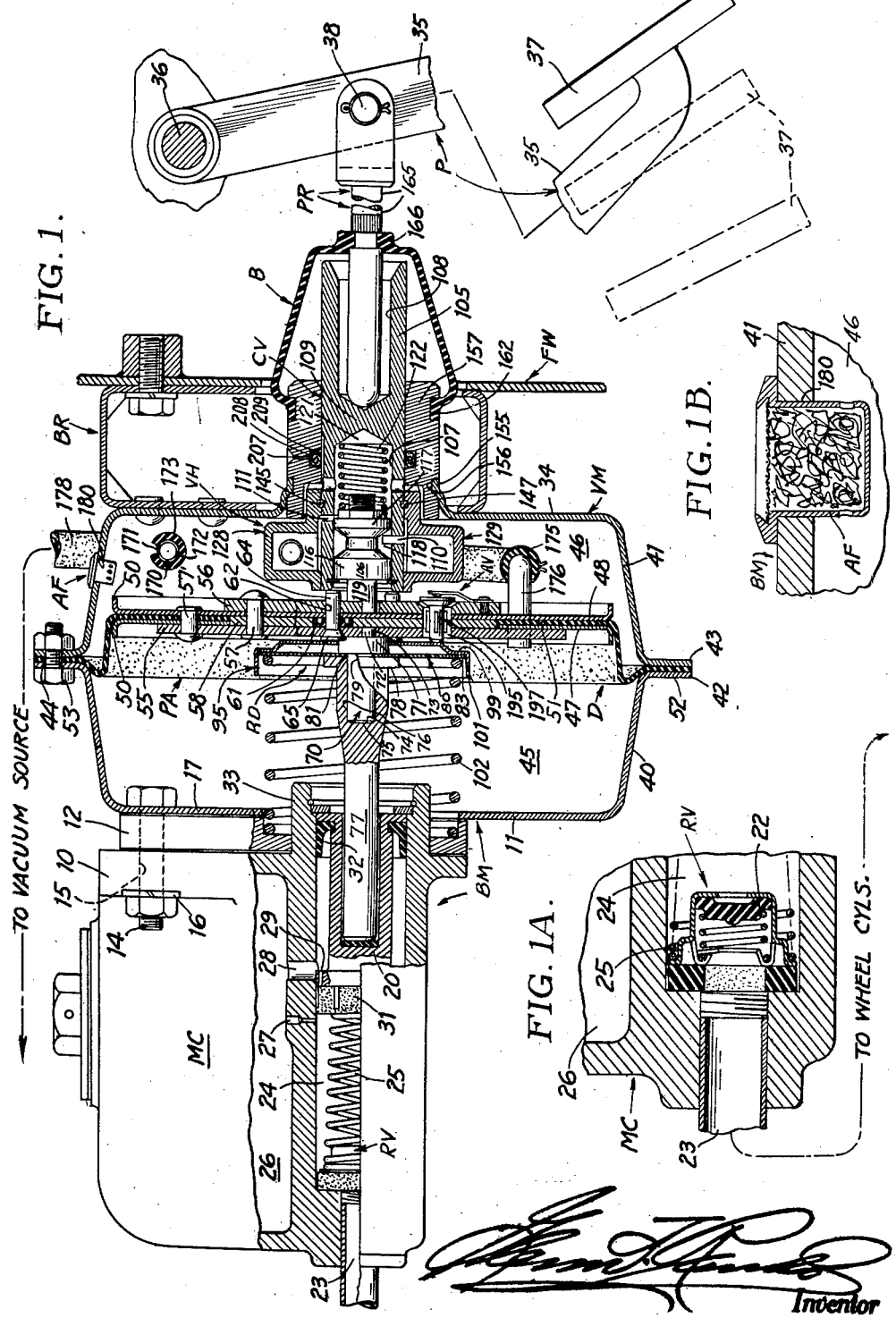
FIGURE 1 is a longitudinal vertical section of a booster brake mechanism embodying my invention, and exemplarily shown connected to operate the master cylinder of a hydraulic brake system conventionally employed on automotive vehicles or the like, and wherein the vehicle brakes are fully released.

The movable power assembly PA, which is referred to elsewhere in this specification and in certain of the claims as a pressure-responsive movable wall or unit, power-diaphragm, power-piston or member, provides with the inside of the end wall 11 on which the master cylinder MC is mounted, a variable pressure or vacuum chamber 45, and the space between the opposite side thereof and wall 34 defines a constant pressure or atmospheric chamber 46, said power assembly comprising: a pair of cup-shaped juxtapositioned plates 47, 48 mounted back-to-back with plate 47 having a coaxial central circular opening at 49, with their outer peripheral marginal portions flanged oppositely at 50. A ring-like flexible power-diaphragm generally designated D is provided with inner and outer peripheral marginal portions 51, 52 respectively with the inner portion disposed between the backs of the plates 47, 48 and the outer portion provided with holes in registry with the holes 44 in the flanges 42, 43 and disposed therebetween to anchor the diaphragm to the inner side of the vacuum cylinder at the diverging juncture of the two casings and diaphragm are assembled, for example, as by clamping bolts 53 inserted through the holes 44 and drawn tight with nuts to provide a rigid unitary assembly of the two casings as shown. The inner peripheral portions of said diaphragm D and plates 47, 48 are clamped in airtight sealed relation between a forward circular thrust plate 55, and a rearward smaller circular plate 56, by an inner and outer set of fasteners such as, for example, rivets 57 and 57' respectively and arranged as shown in FIGURES 1, 3 and 4. A circular spacer plate 58 is disposed in the openings 49 between the plates 55, 56 and is provided with a plurality of holes 60 preferably four in number adjacent its periphery in circumferentially equally spaced relation which are fitted with pliant ring seals 61 of the concentric double-lip type. Four holes 62 are provided through each of the plates 55, 56 of smaller diameter than holes 60 in coaxial disposition with respect thereto through which actuatable pins 64 slidably project via said seals 61. The pins 64 are provided with heads 65 tapered inwardly on their underside adjacent the body of the pins to normally engage complemental countersinks 66 which terminate the holes 62 in the thrust plate 55 to insure the power chamber 45 is sealed against leaks past the pins 64 when in released position notwithstanding the power assembly may be in an operating position, said seals 61 preventing leaks past the body of the pins when the latter are actuated during power assistance as will appear. A central circular opening 68 is provided in the plate 56 to be later referred to.

A force-transmitting pilot member or stem generally designated 70 having a medially disposed external annular flange or shoulder 71 fixed coaxially adjacent the forward side of the thrust plate 55 as by welding the right end extension 72 of the stem in a centrally disposed hole 73 through a portion of the movable power assembly PA of the motor, the terminus of the other end extension 74 of the stem normally engages the closed end 75 of a blind axial bore 76 of predetermined depth extending from the inner end of a work-performing element disclosed herein as a plunger 77, with the opposite end of said plunger operably projecting through the circular openings in the end wall 11 of the vacuum-motor VM and adapter plate 12 for mounting it to actuate the master cylinder piston 20 opposed by spring 25 best demonstrated in FIGURE 1. The exterior of the inner end of the plunger 77 is provided with a flush circular flange or shoulder 78 to serve as a fulcrum block of larger diameter than shoulder 71, said shoulders 71, 78 being coaxially disposed and normally spaced predeterminately to provide an annular variable space 79 therebetween when the stem extension abuts the closed end of the bore 76 best demonstrated in FIGURE 2. Accordingly, the aforesaid piloted connection between the plunger and stem accommodates relative separation of these parts to widen the space normally obtaining between said shoulders for an important purpose to appear.

The improved reaction device generally designated RD comprises a normally relaxed resilient diaphragm or disc 80, preferably of circular configuration, and having a central aperture 81 through which the stem flange 71 projects to slidably support the disc in coaxial disposition with respect to the plunger flange 78, the marginal portion 82 adjacent the perimeter of said aperture being loosely disposed between the shoulders 71, 78 since the thickness of the disc is, for example, .005 to .007 in. less than the normal width of the space between said shoulders to prevent fracture of the disc as a consequence of the hammer-action between the shoulders were the marginal portion of the disc impinged therebetween under tension. The circular marginal portion adjacent the peripheral edge 83 of the disc on the same side as the stem shoulder 71, is acted on by the pedal 35 via means to be fully described later, to "cup" (deform) the disc forwardly to change it from a substantially flat plane to a concavity in consequence of the lever-action between the shoulders 71, 78 with the latter shoulder acting as the fulcrum point which may be varied according to the division of work desired between the operator of the vehicle and the booster unit BM by changing the height of said shoulder 78. This lever-action tends to force the power diaphragm PA rearwardly slightly and to apply pressure on the plunger 77 in a fluid pressurizing direction thus effecting slight relative separation of these two components (see FIGURE 6) with the marginal portion 82 encircling said aperture 81 disposed out of parallel with respect to the shoulders 71, 78. Accordingly, dishing of the disc as aforesaid induced by the said lever-action sets up a progressively increasing tension in said disc in accordance with the distance the peripheral edge 83 is deflected out of parallel plane with respect to the inner marginal portion 82 to thereby serve an initial role of conditioning the master cylinder MC for operation prior to the power phase becoming effective, and to provide reaction from the master cylinder on the operator-operated member (pedal) 35 in accordance with the leverage-ratio and tension characterizing the disc for a given diameter, thickness and/or perforation pattern of said disc. This reaction is produced by the vacuum-motor diaphragm PA when energized after the disc 80 has been tensioned as aforesaid, and is transmitted from the shoulder 71 acting on the perimetrical edge of the aperture 81, fulcrum shoulder 78 thence through the disc body to the operator member via the pins 64 carried by the power assembly PA as will appear. As the power diaphragm PA increases its output on the edge of the aperture 81, the abnormally separated condition aforesaid of the shoulders 71, 78 is progressively dissipated until the normal space therebetween is restored wherein the stem extension 74 abuts the end wall 75 of the plunger 77 to provide a "straight-through" thrust on the plunger 77 from the power diaphragm as is understood, while the peripheral portion of the disc 80 is held forwardly under tension by the pedal 35. At the point where the power output is sufficient to reestablish the shoulders 71, 78 in their normally spaced relation shown in FIGURE 2, whether or not this point defines power-runout, reaction through the disc becomes substantially constant in consequence of the loss of lever-action between the power-actuated shoulder 71 and the fulcrum shoulder 78 on the plunger 77 since the plunger has reached the status of being substantially stationary due to the non-compressible nature of the column of brake fluid as is understood. But, as long as the working force of the vacuum-motor VM is sufficient to effect the braking pressure desired without eliminating the abnormally separated condition of the shoulders 71, 78 reaction from the master cylinder via the plunger 27 increases progressively, but not proportionally, as the motor output increases due to the lever-action on and the resilient nature of the disc 80 which may also be termed a "spring-lever" since the disc combines lever and spring characteristics for transmission of reaction.

Varying the degree of resiliency in the disc 80 may be obtained in accordance with the springy characteristic thereof and by varying the shape, diameter, thickness or cutouts therein depicted exemplarily in FIGURES 9 through 9E. As demonstrated in these views, the disc 80 may be fabricated with a plurality of inwardly projecting radial fingers (levers) 85 joined at their outer ends by a circular web 86 (FIGURE 9A), or outwardly projecting radial fingers 87 joined at their inner ends by a circular web 88 (FIGURE 9B), or joined intermediate their outer and inner ends by a circular web 89 (FIGURE 9C), or their outer and inner ends joined by the circular webs 86, 88 respectively (FIGURE 9D), or a two-finger disc may be employed such as illustrated in FIGURE 9E having opposed sector-shaped cutouts 90 to provide two diametrically disposed inwardly projecting fingers 91 connected at their outer ends by the circular web 86, the inner ends of said fingers being straddle mounted on the stem extension 74 and extending on opposite sides thereof substantially to the axis of said extension for shoulder 71 to act thereon. The resilient characteristic of the disc combined with its lever-action determines the division of reaction force transmitted to the power member PA and the operator-operated assembly P which important feature of the invention will be more fully described hereinafter.

Accordingly, a wide range of reaction discs may be produced by incorporating the illustrated configurations of cutout patterns or combinations thereof in the solid disc shown in FIGURE 9, said cutouts serving to reduce resistance to "dishing" of the disc. In this manner, the present power-booster apparatus BM may be provided with selective spring-pressure reaction to produce the desired pedal "feel" according to the type of vehicle and/or pedal system employed, that is, a moderately "low-pedal" or a normal height pedal which vary in their mechanical advantage according to the distance provided for pedal movement in relation to the full operating stroke of the master cylinder MC.

Slidably mounted on the annular flange 71 of the pilot stem 70 is a circular cup-shaped member or spring generally designated 95. This spring seat is normally juxtaposed with respect to the forward side of the thrust plate 55 in engagement with the pin heads 65 which move the seat from the thrust plate 55 (see FIGURE 6), said spring seat comprising: a vertical bottom wall 96 constantly engaged by the pin heads 65 and centrally apertured at 97 through which said annular flange 71 projects to slidably support the spring seat in operating position, a peripheral offset at 98 in the wall 96 provides an inner annular shoulder 99 against which the marginal portion adjacent the peripheral edge 83 of the resilient disc bears, said member 95 terminating forwardly in a circular horizontal wall or flange 101. A normally preloaded compression spring 102 encircles a portion of the plunger 77 with one end bearing on the inner marginal shoulder provided by a counterbore which terminates the opening through the adapter plate 12, such positioning of the end of said spring being accommodated by coaxial openings in the gaskets and end wall 11 respectively being of the same diameter as the counterbore as shown in FIGURE 2. The other end of spring 102 reacts on the opposite side of the peripheral portion aforesaid of the resilient disc 80 to maintain the periphery of the disc 80 in engagement with the offset 99 and to urge the spring seat to act through the pins 64 on the power assembly PA to move the latter as a unit with the spring seat toward their respective normal positions shown in FIGURES 1 and 2. The reaction produced by this spring is in sharp contrast to that produced by the reaction disc 80, in that, spring 102 offers increasing resistance to the pedal 35 in relation to the distance the pedal is moved from its normal position shown in FIGURE 1 and therefore, the reaction transmitted thereby to the pedal is not related to pressure produced by the power assembly PA on the plunger 77. In fact, the reaction from spring 102 is somewhat transitory serving to provide increasing resistance on the pedal up to the point of the master cylinder MC becoming conditioned to pressurize the fluid therein to effect a braking application under influence of the energized vacuum-motor VM, and thereafter, reaction of the master cylinder becomes substantially constant due to the virtually stationary condition of the parts utilized to pressurize the fluid brought about by the non-compressible column of fluid as is understood. This spring, therefore, serves the novel purpose of supplementing the resilient disc 80 during conditioning of the master cylinder MC to pressurize the brake fluid sufficiently to apply the brakes under influence of the vacuum-motor VM, but during the fluid pressurizing stage aforesaid, reaction from spring 102 is substantially constant while the resilient disc 80 continues to transmit a progressively increasing force on the pedal 35 during the power-applying stage up to the point where the vacuum-motor effects a "straight-through" operation on the master cylinder MC which point approximates introduction of assistance from the operator as will be more fully explained hereinafter.

The control valve mechanism generally designated CV is similar in construction and operation to that disclosed in my earlier application Serial No. 684,946 previously referred to and comprises: outer and inner telescopically-related elements 105, 106 which are disclosed as a cylindrical valve sleeve and valve piston respectively. The valve sleeve 105 is provided with a longitudinal bore 107 extending from its inner end to substantially a medial point therein and a reduced coaxial bore 108 extending from the other end to such depth as to provide a thrust wall 109 between said bores. Spaced from the inner end of the valve sleeve is a vacuum slot 110 through the wall thereof communicating with the bore 107 and longitudinally spaced rearwardly from said vacuum slot 110 is an air-vacuum control slot 111 through the wall of the valve sleeve in diametrically disposed relationship and communicating with the said bore 107. An internal annular groove 114 is provided in the surface of the bore 107 adjacent the inner end of the valve sleeve.

The valve piston 106 is a spool-type element comprising a pair of longitudinally spaced annular lands 116, 117 which define a ring-like vacuum chamber 118 therebetween in continuous communication with the vacuum slot 110, the outer opposite ends of said lands terminate in reduced diameter cylindrical extensions 119, 120 respectively. The cylindrical surface of the extension 120 is threaded and the free end of the extension 119 is loosely piloted in the opening 68 in plate 56 aforesaid to maintain substantially coaxial relationship between the main control valve mechanism and the movable power assembly PA, and also to enable the end of extension 119 to engage the confronting surface area on the plate 48 and thereby move as a unit to produce the usual follow-up action requisite for operation of the main control valve means CV provided by the relative movement therein to effect opening and closing of the control-slot 111. The valve land 117 is spaced from the thrust wall 109 to provide an atmospheric chamber 121 therebetween selectively connectible to the control-slot 111, said land being termed a "working" land because it is operable to selectively connect the control-slot 111 to the vacuum valve chamber 118 and to the atmospheric valve chamber 121, said vacuum valve chamber being subject to vacuum (negative pressure) at all times when the engine is running via the vacuum-slot 110, such sub-atmospheric conditions being generated, for example, in the engine inlet-manifold (not shown) as a vacuum source. Operably disposed in the valve chamber 121 is a normally preloaded compression spring 122 having one end bearing on the thrust wall 109 and the other end piloted on the reduced threaded extension 120 to react on the confronting face of a preferably hex-type nut 123 selectively threaded onto said extension to establish the desired preloaded setting of spring 122, said nut being capable of manual adjustment along the extension away from and toward said land to increase or decrease respectively the tension in spring 122 and thereby vary the degree of shoe-to-drum contact during the initiatory brake-applying stroke and reaction on the brake-pedal. This spring is effective to separate the valve piston and sleeve and accommodate their movement toward each other within the limits of the relative operating movement shown at 125 normally obtaining between the inner end of the valve sleeve 105 and confronting surface area on the thrust plate 56 to enable the valve elements to move relatively to each other to control operative energization of the power assembly PA. A split retainer ring 126 engages the groove 114 for engagement by the peripheral outer face portion of the valve land 116 to establish the normal separated status of the main valve elements under influence of the spring 122 as shown in FIGURE 2, and wherein the relative operating disposition of the valve sleeve is shown with respect to the thrust plate 56 in readiness for a valve operating cycle as will appear.

Encircling the forward portion of the valve sleeve 105 is a valve housing generally designated PH and comprising a pair of interchangeable semicircular segments 128, 129 clamped around this portion in airtight sealed relation by a pair of hex cap screws 130 oppositely projecting through holes 131 in a pair of laterally extending flanges or ears 132 which terminate opposed arcuate portions of said segments, into threaded holes 133 through complemental lateral flanges or ears 134 which terminate the other opposed arcuate portions of said segments to thus tightly clamp the two halves 128, 129 of the valve housing VH on the valve sleeve 105 to provide a unitary assembly thereof. Formed in the inner curved surface of each of the segments 128, 129 is a rectangular-shaped arcuate cavity 135, the cavity in the upper segment 128 having continuous communication with the control-slot 111 and the lower segment 129 having continuous communication with the vacuum-slot 110 via the cavity 135 thereof. Aligned with the cavity in the upper segment 128 is a rectangular-shaped upstanding embossment or boss 136 integral with the circular wall of said segment, and there is a similar embossment or boss depending from the circular wall of the lower segment 129. Each of said embossments being provided with a vertical hollow or passageway 138 which communicates with the cavities aforesaid, and a substantially horizontal passageway 139 continuously communicates with each of said hollows. A rigid tubular fitting 141 is pressed at one end into each of the passageways 139 to provide a vacuum inlet into the interior of the main control valve CV, and an air-vacuum connection from said valve respectively as will appear. The inner ends 142 of the semicircular walls of the segments 128, 129 in assembled relation terminate flush with the inner end of the valve sleeve 105 to provide a circular working face 143 which continuously engages the ends of the pins 64 projecting through the movable power assembly PA whereby movement of the valve sleeve 105 actuates said pins as a unit which in turn simultaneously move the spring seat member 95 disposed adjacent the opposite side of the power assembly PA best demonstrated in FIGURE 2. The aforesaid working face is predeterminately spaced normally from the confronting face area on the plate 56 to establish the relative operating movement of the main control valve means CV whereby movement of the valve sleeve 105 to open said valve means CV actuates the pins 64 relatively to the diaphragm plates 55, 56 to move the spring seat 95 forwardly away from the plate 55 to additionally compress the spring 102 and thereby increasing resistance to movement of the valve sleeve 105, which resistance is progressively induced in accordance with the distance the movable wall PA is moved as a measure of the pressure being exerted by said movable wall on the brake fluid in the hydraulic brake system (not shown). It should be importantly noted here that during energization of the vacuum-motor VM, the spring 102 reacts only on the spring seat 95 and valve sleeve 105 which prevents power-loss that would result should the movable wall PA be required to overcome the force of this spring as is common practice in prior art devices.

Intermediately spaced with respect to the cavities in the aforesaid segments 128, 129 and the rear ends of the circular walls thereof, is a semicircular internal groove 145 which in the assembled status of the housing segments produces an internal annular groove 146 which receives the outer half-diameter in cross section of a split round wire retainer ring 147, and the inner half-diameter thereof engages a circularly aligned external annular groove 148 in the outer cylindrical surface of the valve sleeve 105 to lock the valve housing segments against relative axial displacement with respect to said sleeve.

Each of the segments 128, 129 is provided with an indentation or notch 150 in the rear end of the circular walls thereof and diametrically disposed in their assembled status on the valve sleeve 105. These notches register with correspondingly disposed air ports 151 through the wall of the valve sleeve whereby the atmospheric valve chamber 121 communicates continuously with the power cylinder atmospheric chamber 46.

The power cylinder end wall 34 is provided with a circular opening 154 coaxial with the openings in the forward end wall 11 and associated plates aforesaid, said opening 154 terminates in an outturned circular flange 155 which is radially closed inwardly into an external annular groove 156 formed in the outer cylindrical surface of a bearing or support collar 157 to make the collar fast on the end wall 34. The interior of the collar is provided with an inner counterbore 158 in coaxial disposition with respect to a longitudinal bore 159 to provide an annular shoulder 160 therebetween, the bore 159 serving as a bearing support for the rearwardly projecting portion of the valve sleeve 105 exterior of the valve housing VH best demonstrated in FIGURE 2. Shoulder 160 is engageable by the rear ends of the valve housing segments 128, 129 aforesaid to establish the main control valve mechanism CV in its normally released position. Another external annular groove 161 is provided on the collar 157 rearwardly spaced from the groove 156 for receiving the forward annular end 162 of a conventional flexible dust boot B.

The free end 165 of the push rod PR projects through a reduced diameter bead 166 terminating the opposite end of said boot B into the bore 108 in the valve sleeve 105 to engage the thrust wall 109 whereby movement of the pedal P is transmitted via the push rod PR to initially actuate the valve sleeve 105 as a unit with the valve piston 106, followed by relative operating movement of the valve sleeve and piston to control operative energization of the booster motor VM. Upon such relative movement being fully taken up as a consequence of the working face 143 engaging the plate 56, a "straight-through" application of operator input effort is provided against the movable power assembly PA to assist the maximum output effort of the latter to apply the brakes.

A rigid vacuum-inlet tube 170 projects through the cylindrical wall of casing 41 at 171 (see FIGURE 4), the inner projection portion 172 of said tube receiving one end of substantially a convolution of flexible conduit 173 and the other end of said conduit is attached to the lower tube 141 in the lower valve housing segment 129 whereby vacuum inlet to the arcuate cavity 135 thereof and relative movement of the control valve sleeve 105 with respect to the movable wall PA are provided. One end of another flexible conduit 175 is connected to the free end of an elbow-type tube 176 having its other end secured to and projecting through the plates 55, 56 in continuous communication with the power chamber 45 aforesaid, and, the other end of the last-mentioned conduit being connected to the upper tube 141 whereby the cavity 135 of the upper valve housing segment 128 is connected to said power chamber and relative movement between the movable power assembly PA and control valve sleeve 105 also provided thereby. The outer projecting portion 177 of the tube 176 receives one end of a third flexible conduit 178 and the other end of this latter conduit is connected, for example, to the interior of the engine-inlet manifold (not shown), thereby completing the vacuum line connection to the main control valve mechanism CV.

An air filter device of conventional construction is provided at AF (see FIGURE 1) and which is press-fitted or otherwise secured in an opening 180 through the cylindrical wall of the power cylinder casing 41 for venting the power cylinder chamber 45 to atmosphere via chamber 46, and for filtering out any foreign particles, moisture, etc., from entering said chambers with consequent involvement of the working parts within the booster motor VM. This filter device further serves to silence ingress of air when the vacuum-motor VM is being operated toward released position in response to removing pressure from the pedal P and wherein the motor vehicle brakes are taken "off" as is understood.

The reaction plate or disc 80 shown per se in FIGURE 9 is devoid of perforations radially disposed from its central aperture while the modified plates shown in FIGURES 9A, 9B, 9C, and 9E are so perforated to change the reaction-transmitting characteristics thereof with respect to each other and to the washer-type disc depicted in FIGURE 2, such operating characteristics could also be varied by changing the thickness and/or adjusting the diameter thereof. Since the plate depicted in FIGURE 9A is typical of the other modified plates, a brief description of the construction thereof is deemed apropos as follows: As shown in FIGURE 9A this modified plate is of circular configuration and formed with a plurality of radially disposed perforations or slots as indicated between said inwardly projecting fingers 85, the inner ends of said fingers, define said circular opening 81. The outer ends of said fingers are interconnected by the web segments 86 to provide the aforesaid circular web 86 which engages the offset shoulder 99 on the seat member 95 aforesaid. The inner marginal portions 82 of the fingers are operably disposed between the plunger shoulder 78 and pilot stem shoulder 71. These fingers may be interconnected at their inner ends by web segments as indicated to provide the aforesaid circular web 88 disposed between the shoulders 71, 78 as demonstrated in FIGURES 9B, 9D, or interconnected intermediate thereof by web segments depicted in FIGURE 9C to provide the aforesaid circular web 89, or the sector cutouts 90 as shown in FIGURE 9E may be employed to provide the aforesaid circular web 86 with two diametrically opposed fingers 91 aforesaid. Accordingly, the disc 80 may be provided with numerous perforated patterns to change the resilient characteristic thereof for a given thickness of material and diameter, and further the lever-action ratio may be modified by adjusting the relative contact points on the shoulders 71, 78 and seat member 95 to modify the reaction force effective on the control valve sleeve 105 and therefore the pedal 35 whereby the force exerted on the pedal may be adjusted to suit the particular installation and/or operator preference.

Figure 6:
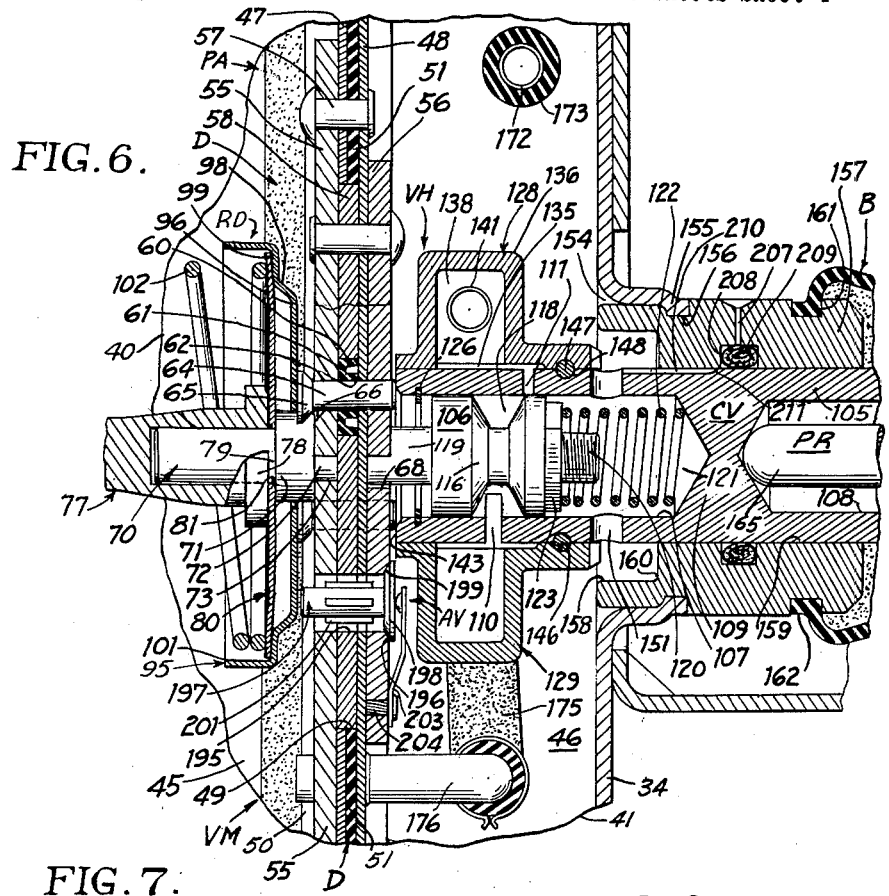
FIGURE 6 is a longitudinal vertical section similar to FIGURE 2 on substantially the same scale showing the parts moved to their relative operating positions corresponding to inauguration of energization of the vacuum motor to assist in pressurizing the fluid in the master cylinder.

The auxiliary or vacuum relief control valve AV comprises a longitudinal circular passageway 195 radially offset from the axis of the main control valve CV, and which extends through the plates 55, 58, 56 in that order to normally place the power cylinder chambers 45, 46 in communication with each other when open, thereby balancing pressures on opposite sides of the movable power member PA. The end of this passageway on the plate 56 terminates in an annular preferably tapered valve seat 196. A poppet-type valve element 197 is movably disposed in the passageway and provided with a head 198 having a complemental face 199 for engaging the said valve seat to close said passageway. Projecting from the head through the passageway is a stem 200 having a plurality of elongated radially disposed fins 201 of substantially the same overall diameter as the passageway, to slidably guide the valve element into engagement with its valve seat aforesaid, said fins providing longitudinal spaces 202 therebetween to enable air flow through the passageway when open. The stem operably engages a confronting portion of the back of the spring seat member 95 in normal disposition as shown in FIGURE 2 to move the head of the valve element 197 away from its cooperating seat and thus connect the chambers 45, 46 so that pressures on opposite sides of the movable power member PA are balanced. The length of the stem 200 is such that upon movement of the spring seat member 95 away from the thrust plate 55, under influence of the pedal P, that the poppet valve engages the seat 196 to isolate the chambers 45, 46 from each other thereby conditioning the movable power member PA to be subject to differential pressures on opposite sides thereof induced by opening the main control valve CV after the poppet-valve 197 has been seated. It should be noted in this connection that the valve sleeve 105 and spring seat member 95 move as a unit and the timing of the opening of the control-slot 111 to evacuate the power chamber 45 of air is such that this latter operation transpires as or after the poppet-valve closes in the manner explained above, otherwise, air in the power chamber 45 could not be evacuated to create such differential pressures under control of the main control valve CV since chamber 45 would be connected to atmosphere via chamber 46. Stated differently, the poppet-valve must be closed before the main control valve CV can be effective, even though open, to energize the vacuum-motor VM. This poppet-valve may be termed a "vacuum-relief" or "auxiliary air valve" since its function is to place both chambers of the power cylinder VM in communication with atmosphere in cooperation with or independently of the main control valve CV, upon removal of foot pressure from the pedal P at any applied position thereof, to enable the return springs aforesaid and pressure on the brake fluid to effect quick return of the mechanism to brake "off" position irrespective of the rate of withdrawal of the foot from the pedal whereby the operating parts associated with the pedal keep pace with it toward their fully released positions. In this way, a slowed brake release is prevented thus making it possible to apply and release the brakes as rapidly as conditions require. Of course, the control-slot 111 could be made wider and deeper in the valve sleeve 105 with the valve working land 117 proportionately widened to accommodate a more rapid ingress of air into the power chamber 45 when taking the brakes "off" but such would act adversely to a smooth sensitized control of the booster motor VM in relation to the shortest possible pedal travel requirement to effect operation of the main control valve CV to energize the motor VM. Accordingly, the poppet-valve preferably serves as an auxiliary air inlet to the power chamber 45 in cooperation with the "off" position of the main control valve CV so that release of the vehicle brakes occurs in synchronism with the rate of removal of foot pressure from the pedal P; but if the main control valve CV is slowly released, ingress of air via the control-slot 111 into the power chamber 45 enables the retraction of the operating parts simultaneously with pressure removed from the pedal as is understood. In either case, however, venting of both motor chambers 45, 46 to atmosphere by the poppet-valve at full release of the pedal pressure assures that the operating parts are fully established in their respective released positions wherein the master cylinder compensating port is fully uncovered for the fluid to properly adjust in the hydraulic system. Partial evacuation of the power chamber 45 tends to draw the poppet-valve head 199 toward its seat by the air pressure effective on the opposite side of the head and thus seal off the chamber 45 from the chamber 46, however, a normally pretensioned flat spring 203 is provided with one end anchored as by a drive pin 204 on the plate 56 and the other end overlying the valve head to react thereagainst to insure seating of the head when the stem 200 is released by movement of the spring seat member 95 away from the thrust plate 55 as shown in FIGURE 6 where slight clearance obtains between the end of the stem and vertical wall of the spring seat member 95. Closed condition of the relief valve must coincide with the "lapped" position of the working land 117 and control-slot 111 to enable holding the brakes "on."

The support collar 157 is further provided with a radial passageway 207 which is flared at its outer end, and the inner end of which intersects an internal annular channel 208 formed in the bore 159. An oil saturated ring-type wick 209 is carried in this channel in encircling relation with respect to the exposed exterior cylindrical surface of the valve sleeve 105, to provide lubrication for this surface and the surface of the bore 159. A flat 210 having a shoulder 211 is provided in the outer surface of the valve sleeve 105 which communicates with the wick 209 in the normally released disposition of the control valve mechanism CV shown in FIGURE 2, said flat having continuous communication with the upper air port 151 whereby ingress of air through this port induces the lubricant suspended in the wick to move toward said air port and thence into the interior of the sleeve to lubricate the valve piston 106. The aforesaid shoulder which terminates the rear end of the flat 210 tends to wipe the lubricant from the wick during sliding movement of the sleeve 105 relative to the collar 157 which wiping action cooperates with the air flow into the interior of the valve sleeve 105 to place at intervals small quantities of lubricant near the port 151 so that it may be drawn into the interior of the sleeve. In this manner an efficient lubricating system is provided for the working parts aforesaid by simply introducing periodically a small quantity of oil as by the spout of an oil can engaging the flared end of the passageway 207, to maintain the wick saturated. Over-lubrication is prevented by the control-slot 111 and bottom air port 151 which drain off excess oil, the port 151 conveying such excess to the atmospheric chamber 46 of the vacuum-motor VM, and any excess oil reaching the cavity in the lower valve housing via control-slot 111 when the main control valve CV is disposed as shown in FIGURE 2, would be drawn into the valve vacuum chamber 118 when the motor is energized with consequent lubrication of both of the valve lands, and any excess lubricant in the valve chamber would ultimately reach the engine inlet-manifold (not shown) under influence of vacuum and be dissipated in the combustion chambers of the engine as is understood.

*Operation*

The operation of my improved booster brake mechanism BM will be apparent from the foregoing description but may be summarized as follows:

Assuming the device BM is installed on a motor vehicle as the present disclosure exemplarily demonstrates in FIGURE 1, to operate the hydraulic brake system (not shown) commonly employed on such vehicles, is in released brake "off" condition as depicted in FIGURES 1 and 2. With the engine running, sub-atmospheric pressure (vacuum) is produced within the inlet-manifold (not shown) which is conveyed through conduit 178, tube 170, conduit 173, tube 141, cavity 135 in valve segment 129, and vacuum-slot 110 to evacuate the air from annular space 118 on the valve piston 106 which conditions the main control valve mechanism CV for operation to control operative energization of the vacuum-motor VM.

Figure 7:
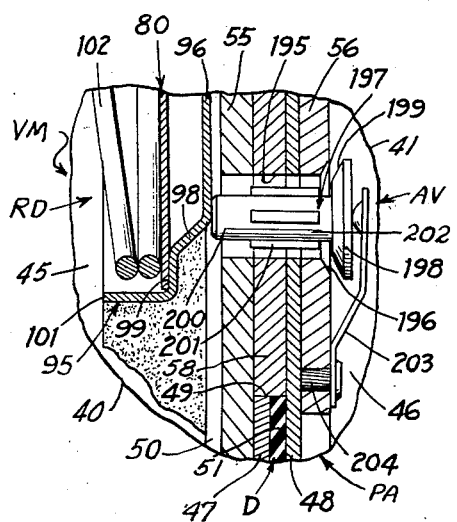
FIG. 7 is a fragmentary sectional view of FIGURE 2 showing the vacuum relief valve on an enlarged scale for clarity of detail.
Figure 8:
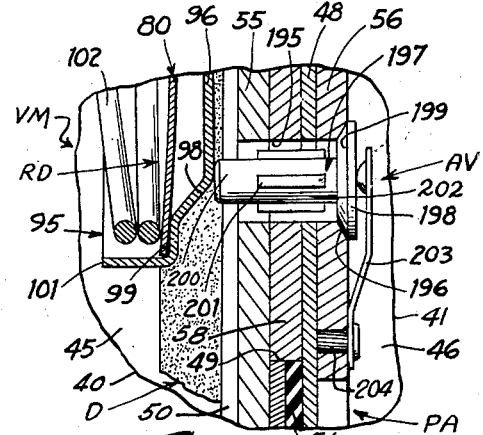
FIGURE 8 is a fragmentary sectional view of FIGURE 6 showing the vacuum relief valve on the same scale as FIGURE 7 for clarity of detail.

In the normally released disposition of the valve sleeve and piston 105, 106 portrayed in FIGURES 1 and 2, the vacuum power and atmospheric chambers 45, 46 respectively are vented to atmosphere, the power chamber 45 being vented via the elbow-tube 176, conduit 175, tube 141, cavity 135 in valve segment 128, passageway 139, control-slot 111, atmospheric valve chamber 121, ports 151, notches 150, atmospheric chamber 46 and the air filter AF, and, as previously stated, the chamber 46 is in continuous communication with the atmosphere via said filter device. Also the vacuum relief valve AV is in open disposition as shown in FIGURES 1, 2 and 7 thereby cooperating with the control-slot 111 in the main control valve CV in normally released position to unrestrictedly accommodate free flow of air between the motor chambers 45, 46 to balance the pressure therein. Accordingly, the power cylinder VM and related parts including the power assembly PA are in their respective normally released positions as shown in FIGURE 1 in readiness for a brake-applying cycle.

Initial depression of the pedal 35 to the first dashed line position in FIGURE 1 moves the valve sleeve and piston 105, 106, power member PA and fluid-displacing unit comprising the hydraulic piston 20 and related parts as a unit, which unitary operation simultaneously advances the cup seal 31 against the action of spring 25 to the position of FIGURE 6 wherein the compensating port 27 is closed thereby conditioning the master cylinder MC for operation to apply pressure on the liquid in the pressure chamber 24 and displace it through the one-way check-valve 22 into discharge port 23 and thence via the hydraulic lines (not shown) into the wheel cylinders (not shown) to expand the brake shoes (not shown) into contact with the internal frictional surface on the brake drums (not shown) rotatable with the vehicle wheels (not shown) to apply the brakes as is understood. This unitary initial movement of the parts aforesaid is effected by operator force on the pedal 35 acting through the preloaded thrust-transmitting capacity of the main control valve return spring 122 and resistance of the reaction device RD against deformation (dishing) to place it under tension. Valve spring 122 is preferably installed under 15 to 20 pounds, or may be lighter where the resilient plate 80 is designed to produce sufficient tension to effect the aforesaid unitary movement of the parts as a preliminary conditioning operation to the master cylinder MC prior to operating to pressurize the fluid therein sufficiently to firmly set the brakes. In any case, however, spring 122 must be installed under sufficient tension to overcome the reaction from spring 25 otherwise the aforesaid initial movement of the parts as a unit cannot be accomplished under influence of the pedal 35 operated from its normally released position wherein the vehicle brakes are "off," and also the main control valve CV is in closed "off" position and the auxiliary valve AV open. Spring 25 in conventional practice is usually set to establish a normal preloaded condition of around 5 to 10 p.s.i. against the residual pressure valve RV to establish a minimum line pressure within that range external to the pressure-working chamber 24.

As the power member PA and fluid-displacing unit initially move leftward as a unit to close the compensating port 27 under influence of initial operator effort on the pedal 35 transmitted through the preloaded valve spring 122 supplemented by resistance from the disc 80 to "cup" as defined by the first dashed line position of the pedal in FIGURE 1, increasing pressure on the pedal, pressurizes the fluid in the master cylinder MC at substantially the same pressure as the preloaded tension of said valve spring; whereupon, more pressure on the pedal acts to first cause the spring 122 to yield and the resilient disc 80 to dish into a somewhat cupped configuration as shown in FIGURE 6 to place the disc under tension. This yielding of the spring 122 and simultaneous "cupping" or "dishing" of the disc 80 enable the valve sleeve 105 to move relatively to the valve piston 106 thereby disposing the control-slot 111 with respect to the valve working land 117 to isolate the atmosphereic valve chamber 121 from said slot and to connect the vacuum valve chamber 118 thereto and thereby connect the source of vacuum to the power chamber 45 via the conduit 175 to evacuate the air from said chamber causing differential pressures to be effective across opposite sides of the diaphragm plates 40, 41 to thus energize the vacuum-motor VM. During the tensioning of the reaction disc 80 in the manner above stated, the lever-action thereof tends to separate the work-performing element 77 from the shoulder 71 carried on the pilot stem 70 rigid with the diaphragm thrust plate 55 (see FIGURE 6), and thereby widen the space 79 to condition the reaction disc to transmit reaction from the master cylinder MC to the brake pedal. This lever-action induces a slight rearward movement to the valve piston 106 relative to the forward movement of the valve sleeve 105 under influence of the pedal 35 to bring about the open "on" position of the control valve CV, such relative movement of the control valve members 105, 106 and separation of the plunger 77 and thrust plate 55 resulting from the substantially stationary condition of the fluid-displacing unit (hydraulic piston 20) effected by the non-compressible column of brake fluid between the head of the piston 20 and wheel cylinder pistons (not shown) as is understood. The aforesaid relative movement of the control valve sleeve 105 moves the control-slot 111 into increasing exposure with respect to the annular vacuum chamber 118 after the valve piston working land 117 laps said control-slot to cutoff communication thereof with the atmospheric valve chamber 121, thus enabling evacuation of air from the power chamber 45 via the elbow-tube 176, conduit 175 and connected arcuate cavity 135 in the upper half 128 of the valve housing VH, control-slot 111 and vacuum chamber 118. As air is evacuated from the power chamber 45 differential pressures are set up on opposite sides of the power member PA causing it to move further leftward from the position shown in FIGURE 6 to actuate the hydraulic piston 20 to provide power assistance in applying the brakes. Prior to the vacuum-motor VM becoming energized as aforesaid, the resilient disc 80 is deformed into a "cupped" configuration from its normal flat relaxed status. This deformation of the disc 80 is effected by operator force on the control valve sleeve 105 acting through the pins 64 against the movable seat member 95 to set up tension in said disc, and simultaneously with this tensioning action on the disc, the marginal portion of the disc adjacent the edge of the aperture 81 additionally separates shoulders 71, 78 by lever-action therebetween which correspondingly widens the space 79 normally obtaining between said shoulders. During this lever-action imparted by the disc, the power member PA and valve piston 106 move slightly rearward as a unit against spring 122 relatively to the valve sleeve 105 due to substantially stationary condition of the plunger 77 induced by the non-compressible column of brake fluid whereby the shoulder on the plunger serves as a fulcrum to produce such lever-action through the disc 80 between its pressure points at the periphery thereof against the offset shoulder 99 on the movable seat member 95 and the circular edge of the aperture 81 against the shoulder 71 carried by the thrust plate 55. Accordingly, spring 122 plus resistance of the disc 80 to "dishing" force the fluid displacing unit leftward to operate the master cylinder MC to take up the slack in the hydraulic lines until a point is reached whereat pressure on the brake fluid and reaction from spring 25 reach a factor substantially equal to the preloaded status of valve return spring 122 and resistance to "dishing" provided by the disc which cooperates with the spring 122 to additionally pressurize the brake fluid as the vacuum-motor VM becomes energized.

At the point of relative movement between the control valve sleeve and piston where the control-slot 111 is "cracked" placing the vacuum source in communication with the power chamber 45, the inner marginal portion of the reaction disc 80 is disposed at an angle with respect to the confronting abnormally spaced faces on the shoulders 71, 78, and the peripheral marginal portion of the disc is disposed out of plane with said shoulders. Thus, it may be said that the reaction disc 80 is now conditioned to transmit reaction from the master cylinder MC to the pedal mechanism P. As the output effort of the motor VM increases it is transmitted progressively through the resilient lever-action of the disc to the peripheral marginal portion of said disc with said plunger shoulder 78 acting as the fulcrum. This progressive reaction transferal from the master cylinder continues until the shoulders 71, 78 are forced into normally spaced relation wherein the full inner marginal portion of the disc therebetween assumes substantially parallel relation with respect to said shoulders and the stem extension 74 abuts the closed end 75 of the plunger bore 76. At this stage of power output, it may be said that a state of power-run-out has been reached, that is, the motor VM is providing maximum output which if insufficient to bring about the braking force required, the operator may increase his effort on the pedal 35 to make up such deficiency whereby the working end 143 of the valve sleeve 105 and housing VH is brought into engagement with the thrust plate 56 to enable a "straight-through" application of joint effort from the motor and operator on the hydraulic piston 20. With this arrangement, the operator can instantly and automatically cooperate with the maximum output from the motor VM to apply the brakes directly at any time. Thus, the operator may team up with the motor VM at any time automatically by merely pressing through on the pedal mechanism P to bring about maximum stopping effort, and particularly stops in the emergency-panic category which the motor alone is not powered to handle. When the "straight-through" operation aforesaid is made effective, the end of the extension 74 on the pilot stem 70 is disposed in engagement with the closed end 75 of the axial bore 76 which slidably receives said extension to support the confronting end of the work element 77, and the reaction disc 80 is deformed into its maximum "cupped" condition which becomes slightly forwardly of the position shown in FIGURE 6, whereby reaction from the master cylinder is transmitted by the disc at substantially a constant factor to the brake-pedal with the space 79 restored to normal width as shown in FIGURES 1 and 2. Accordingly, operator force is transmitted through the push-rod PR directly to the outer valve element 105, but at this point such force is transmitted indirectly along two paths; namely, (1) via the valve spring 122, power assembly PA, pilot stem 70, work element 77 and connected piston 20 in opposition to reactive spring 102 and piston return spring 25, to move these parts as a unit to effect slack take-up, and (2) via pins 64 to slidably actuate spring seat 95 relatively to the power assembly PA in opposition to reaction from spring 102 and resistance of the reaction disc 80 to "cupping," to effect relative displacement of the valve elements 105, 106 to open position as shown in FIGURE 6 upon the piston 20 and work element 77 reaching a substantially stationary position against the non-compressible column of brake fluid, and said operator forces are directed along a third path to effect said "straight-through" operation by bringing the inner end of the outer valve element 105 into engagement with the power assembly PA, and thence via the engaged condition of the pilot stem 70 with the work element 77 to the connected master cylinder piston 20. While the resilient nature of the reaction disc 80 eliminates proportional application of effort by the operator and motor VM, it does serve to provide a simple and efficient mechanism for transmitting the necessary increasing reaction to the pedal mechanism P to enable smooth energization of the vacuum-motor. It should be importantly noted that this novel disc reaction principle is a continuous force-transmitting means, that is to say, the disc does not divert and/or absorb any of the motor and operator operating forces, but to the contrary, all of such forces are transmitted undiminished to actuate the hydraulic piston 20 to effect operation of the vehicle brakes.

It is thus seen from the foregoing description of the operation of the resilient disc 80, that actually the slack take-up and initial pressurizing of the brake fluid defined by the dashed line positions respectively of the pedal mechanism P in FIGURE 1, are effected in two stages; namely, the first stage is effected through the force transmitting capacity of the preloaded status of the valve return spring 122 and resistance to "dishing" by the disc 80, and the second stage effects increased pressure on the brake fluid to a point of substantially halting movement of the fluid-displacing unit (hydraulic piston 20) in response to the amount of operative force required to overcome the normal status of both the disc 80 and spring 122 prior to the vacuum-motor VM becoming energized in the manner above stated. Stated differently, the force applied to initially operate the pedal mechanism P to its first dashed line position shown in FIGURE 1 and corresponding to the operated status of the booster mechanism BM shown in FIGURE 6 is impressed on the plunger 77 via the yielding disc 105 and spring 122 aforesaid up to the point at which movement of the plunger and piston 20 is arrested, whereupon further pressure on the pedal receives reaction from the master cylinder MC as a factor of the tension and lever-action of the disc and spring 102 until the power output is at a maximum whereat the reaction from the master cylinder becomes substantially constant on the pedal mechanism since the latter has now joined the power member PA to effect maximum pressure on the brake fluid should such be required.

The utilization of combined tensioning and lever-action characteristics of the disc 80 produce an extraordinary advance in the art to apprise the operator with a measure of the braking pressure effective at a given position of the pedal mechanism P, and while this reactive force from the pressurized status of the brake fluid is not impressed proportionally on the power- and operator-operated members PA and P respectively, it does serve in a new and improved manner to enable smooth mergence of pedal- and power-actuated forces under operator control and thus, the novel reaction device aforesaid provides the operator with a measure of the braking force in effect simulating the more expensive and complicated types of power-brakes which utilize a coaxial hydraulic piston or reaction lever system which transmits hydraulic reaction only upon motor operation, to provide a proportional measure of the total effective pressure on the brake fluid generated in conjunction with a larger hydraulic piston actuated by power means, and too, sealing problems are eliminated since the present vacuum-motor VM accommodates the conventional master cylinder such as illustrated in FIGURE 1.

Spring 102 serves to stabilize the disc 80 on the spring seat member 95 and is characterized by increasing tension on said member above a normally preloaded status progressively induced in response to the distance the pedal mechanism P is moved from released position in a brake-applying direction before the plunger 77 is halted in the manner aforesaid, at which point the reaction from this spring becomes substantially constant on the pedal mechanism to supplement the reaction forces transmitted by the disc 80. The booster apparatus BM is completely operative without spring 102 since spring 25 alone has the capability of returning the fluid-displacing and motor parts to their respective released positions, however, if added resistance to pedal movement during the slack take-up stage is desirable for better braking control, spring 102 would be highly satisfactory for this purpose, and too, it would serve the additional function of reacting on the power member PA via the spring seat member 95 in engagement with the actuatable pin heads 65 to assist in returning the power member to its normally released position shown in FIGURE 1, but when the seat member 95 is disengaged from the power member by the pedal 35 as shown in FIGURE 6, the force of this spring is removed from the power member so that the vacuum-motor VM does not operate against it in a brake-applying direction. Spring 102 possesses another useful function as a supplement to spring 25 to provide a more rapid and sensitized return action on the fluid-displacing and motor parts, and therefore a quicker release of the brakes than would be provided by the spring 25 alone since this latter spring is penalized by a maximum preloaded status and operating rate to control the residual pressure valve RV. Stated differently, spring 25 cannot be rated higher than the requirements for control of the residual valve, and therefore, if reaction from this spring is insufficient to rapidly return the operating parts of the booster apparatus BM to their respective released positions as shown in FIGURE 1 after a brake-applying operation thereof, then the only recourse is to add the spring 102 to obtain the added force to effect such quick release of the parts and at the same time augment resistance to initial slack take-up to condition the motor VM to operate.

Further considering the operational behavior of spring 102, it should be noted that it produces control characteristics in the way of reaction against which the valve sleeve 105 is adjusted to control operative energization of the vacuum-motor VM. This reaction increases above normally preloaded status of this spring in direct proportion to the distance the brake-pedal 35 is depressed, and therefore, such spring resistance alone would not necessarily have a magnitude correlated with the amount of braking force in effect at every position of the brake-pedal, and too, pedal-load would increase toward the end of the full operating stroke of the plunger 77 actuated by vacuum-motor VM to an undesirable degree which would defeat the objective of reduced pedal effort.

As spring 102 is additionally compressed above its normal preloaded status, it provides increasing resistance in relation to pedal movement up to the point where the fluid becomes pressurized, and thereafter, resistance becomes substantially constant on the brake-pedal 35 as a consequence of the substantially stationary condition of the fluid-displacing parts acting on the non-compressible column of fluid as is understood. Since the fluid becomes pressurized at different stations along the full operating stroke of the motor-actuated plunger 77 due to wear on the brake linings and parts, and to minor leakage of the various seals in the hydraulic brake system, it will be appreciated that if the pressurized state of the fluid to apply the brakes becomes effective toward the end of the full operating stroke of the plunger 77, that reaction from the spring 102 can become severe resulting in a moderately "hard-pedal" due to rapid build-up in the force of this spring from its normally preloaded status, the latter providing the operator with accurate sensing in initially applying the brakes thus preventing sudden braking applications which could possibly result in a power-surge if the operator lacks this awareness as he initially applies the brakes.

Reduction of this spring principle to commercial usage, has demonstrated that the preloaded weight should be approximately 20# and rated at maximum compression corresponding to the end of the full operating stroke of the work-performing element 77 at 60# pressure which when transmitted through the pedal leverage ratio reacts on the operator's foot at 5 to 15# through the full operating range of the plunger 77 where a normal height pedal is employed; but if the pedal ratio is lowered to accommodate use of a "low-pedal" with less mechanical advantage, reaction from this spring increases proportionally to a limited extent that converts the low-pedal into a moderately "hard-pedal" as aforesaid through the stage of operating the valve sleeve 105 and piston 106 from normal positions to operating positions to control operation of the vacuum-motor VM. Accordingly, this spring serves to best advantage as a reaction means by utilizing its yielding resistance through substantially the first-half of the series of pressurizing movements along the full operating stroke of the plunger 77 which may be had by keeping the brakes properly adjusted and the system free of leaks which service operations contribute to safer driving. If a lower rated spring is utilized then reaction of sufficient magnitude at points beyond the half-mark of the plunger stroke in a pressure applying direction would not provide the operator with the necessary physical perception of the braking force applied.

The foregoing operation completes what may be termed the "applied stage." With the brakes in applied condition, if operator effort on the pedal 35 is halted, the power member PA will slightly advance relatively in a brake-applying direction carrying with it the valve piston 106 relatively to the control valve sleeve 105 to produce what is termed the "poised or holding stage" at substantially any applied position of the hydraulic piston 20. This latter operating stage results from the usual follow-up action of the control valve elements 105, 106 by a "lapped" (closed) condition of control-slot 111 with respect to valve working land 117 induced by the aforesaid slight relative movement of the power assembly PA with respect to the valve sleeve 105 in the event brake pedal movement is halted as exemplified in FIGURE 6 by the dashed line position of valve land 117. Thus, the brakes may be held "on" with minimum operator effort on the pedal 35 as a result of substantial counterbalance between the differential pressures acting on the power diaphragm PA and the existent hydraulic pressure in the hydraulic lines against the head of the piston 20. If the motor VM should fail to be effective to provide power assistance, the force exerted by the operator on the pedal 35 will bring the inner end 143 of the control valve housing VH and sleeve 105 into engagement with the confronting plate 56, and wherein the relative movement aforesaid therebetween is fully taken up and the pair of valve elements 105, 106 relatively positioned wide open or "on" with respect to the vacuum source and power chamber 45, enabling the operator to operate the hydraulic piston 20 directly by physical force alone if necessary to attain displacement of liquid in the hydraulic lines according to the braking force required to stop the vehicle. With the power phase effective, however, incremental depressing and releasing movements of the brake pedal 35 induce corresponding follow-up movements substantially of the power assembly PA to apply and release the vehicle brakes in a manner replete in the power brake art.

Due to the exactness of the follow-up action of the control valve means CV and the ever present reaction of the springs 102, 122 on the pedal 35, there is never any tendency of the power phase to "over brake" at any given applied position of pedal movement which contributes the highly desirable feature of smooth stops at low vehicular speeds with instinctively predictable control. At high speeds dangerous "grabbing" or "locking" of the vehicle ground wheels is prevented thus producing smooth vehicular deceleration with reduced operator effort, in accordance with the pressure applied on the brake pedal.

Since the auxiliary air valve AV cooperates with the "off" (air incursion) position of the main control valve CV to establish equivalent pressures on opposite sides of the power assembly PA for power-inactivation of the booster motor VM, it is obvious from the disclosure that such "off" position of the main control valve may be eliminated by widening the working land 117 sufficiently to overlie the control-slot 111 when the control valve elements are in normal "off" disposition as shown in FIGURES 1 and 2, and thereby dispense with the function of the atmospheric valve chamber 121, so that the incursion of air into the power chamber 45 is controlled solely by the auxiliary air valve AV in such manner that the vacuum-control of the main control valve CV is synchronized therewith to produce what may be termed the control valve means for the power assembly PA, while excursion of air from said chamber to produce differential pressures on opposite sides of the power assembly is under sole control of the main control valve. In this obvious modification of the control valve assembly, additional auxiliary air valves or enlarged capacity of the one auxiliary air valve shown would have to be provided for rapid incursion of air into the power chamber 45 to sensitize brake release.

The hydraulic pressure chamber 24 being conventional in construction and operation, enables the operator to "pump" the brakes to prevent dangerous brake "fade" whether the power phase is effective or not. Thus on long downgrade operation of the brakes may be carried out in cooperation with power assistance or independently thereof in the usual manner by "pumping" the pedal to introduce more liquid from the reservoir 26 via the intake port 28, ports 29, cup seal 31 into the pressure working chamber 24. During brake-applying movements of the hydraulic piston 20 the pressure developed thereby on the cup seal 31 firmly seats the peripheral outer side of the back wall thereof on the face of the head to thus close the forward ends of the ports 29 preventing escape of the liquid under pressure from the chamber 24 back to the reservoir 26.

When pressure on the pedal 35 is removed, springs 25, 102, 122, and the diaphragm reactor 80 react to reset the fluid-displacing unit, power-diaphragm and control valve CV into their respective released positions shown in FIGURE 1, the spring seat member 95 being biased into engagement with the forward side of the thrust plate 55 via pin heads 65 by spring 102 to assist in the return of said assembly and control valve elements to their respective released positions wherein the relative movement between the power diaphragm and control valve sleeve 105 is re-established through cooperative influence of the springs 102 and 122 which spring operations assist in re-establishing the "released" or brake "off" position shown in FIGURE 1 in which the power chamber 45 is again in communication with atmosphere via the open relief valve 197 and control-slot 111 vented to air via valve air chamber 121 and ports 151. As air enters the power chamber 45 via control-slot 111, chamber 121, ports 151, and conduit 175, the differential pressures are reduced, and eventually dissipated, enabling springs 25 and 102 to return the hydraulic piston 20 and plunger 77, and power diaphragm PA to their respective released positions portrayed in FIGURE 1 wherein the rear end of the control valve housing abuts the collar shoulder 160.

During the return stroke, a predetermined pressure is retained in the hydraulic lines by means of the conventional residual pressure check-valve RV as is understood. If the pressure in chamber 24 falls below atmospheric pressure during the return stroke, brake fluid is drawn through ports 29 from the reservoir 26 past the cup seal 31 into the chamber 24 to maintain said chamber filled.

When the brakes are fully "off" or released as shown in FIGURES 1 and 2, the residual check-valve RV influenced to seat by spring 25 will establish the minimum residual pressure in the hydraulic lines, such as, for example, 5 to 10 p.s.i., and with the port 27 uncovered excess liquid in the system returns through said port to the reservoir and vice versa if additional liquid is required in the system. Therefore, the port 27 is termed a "compensating" port.

If the power phase is disabled or inadequate for any reason, pressure applied on the pedal mechanism P actuates the hydraulic piston 20 "straight-through" in the well known manner with increased operator effort, however, being required as is understood where the factory-installed pedal mechanism is the sole actuating medium for the brakes. Thus, my improved booster-operating mechanism BM may be operated in usual pedal fashion with no additional force required over that normally employed in operating the conventional hydraulic brake system devoid of power assistance.

My improved booster device BM is designed primarily for use in brake installations, such as found on motor vehicles, which are operated preferably by a suspended-type pedal rather than the conventional brake pedal extending through the toe board of the floor in the driver's compartment. Use of the pendant-type pedal as the brake control member simplifies control of the brakes since the device BM can be readily installed in the engine compartment on the firewall for accessibility and at the same time enables movement of the pedal foot pad which the operator's foot engages in accordance with the stroke desired. That is to say, if a lower pedal is desired, length of the push rod PR is adjusted accordingly to establish the pedal pad closer to the toe board, while if a higher pedal is desired the push rod PR would be lengthened to place the pedal pad normally farther away from the toe board. Lowering of the pedal is limited since such travel must be proportionate to the full operating stroke of the hydraulic piston 20. The low-pedal pad adjustment aforesaid removes some of the time lag incident to the operator transferring his foot from the accelerator to the brake pedal and vice versa, and therefore, under certain driving conditions safety in control of the vehicle may be somewhat enhanced. However, actual driving experience with a car equipped with my novel booster mechanism BM, dictates that the longer pedal travel is conducive to better power-braking control through the full vehicular speed range, and added safety is provided should the power phase be inadequate or fail by having the longer operating stroke instantly available to operate the master cylinder MC in the usual pedal fashion without interference from the disabled power cylinder VM. Furthermore, it is difficult to provide "feel" control in a brake operating device of the type under consideration without a degree of pedal movement, rather than a sensitive "touch" pedal travel which tends to cause sudden and erratic operations of the power device VM, because the operator is deprived of a definite resisted movement of the pedal control prior to the power becoming effective. It is this latter serious disadvantage common in prior art devices that my improved brake operating device basically seeks to overcome by providing sufficient brake-applying movement of the pedal mechanism P prior to bringing in the power phase so that lurching stops are avoided, the operator being able to blend the pedal action in taking up substantially all of the slack in the system, with the power phase to produce smooth brake applications under all driving conditions of the vehicle irrespective of the mode of pedal manipulation.

Further considering the relative preloaded strengths of the springs 25, 122, it has been found in commercial practice that the weight of spring 122 should, preferably, be greater than spring 25 and therefore capable of overcoming this latter spring to bring about the conditioning of the hydraulic master cylinder MC for operation in the manner previously described. However, springs 122, 25 may be designed to substantially counter-balance each other in their respective preloaded status and still provide smooth mergence of the power phase with the initial foot-operated phase, but, with the weight of spring 122 greater than the preloaded weight of spring 25, spring 122 is capable of not only overcoming spring 25 but also of transmitting initial movement to the hydraulic piston 20 sufficiently to close the compensating port 27 and subsequently develop some pressure on the brake fluid in the hydraulic lines to provide the operator with a feel of resistance to pedal movement as a signal that inauguration of the power phase is imminent so that unusual smoothness with reduced physical effort results. Where spring 122 is appreciably less or substantially equal to the preloaded status of spring 25, operation of the present booster mechanism BM becomes somewhat erratic and less controllable due to the power phase being inaugurated concurrently with or before the foot-operated phase rather than in the former preferred sequence of following the foot-operated phase. In the arrangement where the power phase leads the foot-operated phase, spring 122 would be insufficiently preloaded to give the driver any appreciable degree of resistance to pedal movement and, therefore, the power phase would be brought in with less control on the part of the driver, and too, the power cylinder VM would become energized suddenly and move initially rapidly since the liquid in the pressure chamber 24 cannot be pressurized until the compensating port 27 is closed which would virtually give the hydraulic piston 20 free unresisted movement through its initial phase before the pressure chamber 24 becomes conditioned by the power device VM rather than in the preferred more controllable arrangement by initial pedal stroke. As will be appreciated, such idle free movement of the power diaphragm PA and associated fluid-displacing parts accelerates initial operation of the power cylinder VM and consequently effects a sudden build-up of the pressure in the hydraulic lines tending to "over-brake," and at low speeds of the vehicle, produces a locking effect on the vehicle wheels to the discomfort of the passengers and added danger of a collision from a vehicle following to the rear.

From the foregoing discussion of the relative strengths of the springs 122, 25, it is contemplated that these two springs should, preferably, be tensioned in their respective preloaded status with spring 122 stronger than spring 25, and that the reactive and return spring 102 should preferably be installed with such tension as would provide the operator with a degree of initial pedal resistance to signal inauguration of the power phase for smooth braking control for all stopping conditions with less expenditure of physical effort throughout the full operating stroke of the pedal mechanism P. It is important to note that the resilient disc 80 also plays an important role in the pedal "feel" produced by my improved vacuum-booster BM since this disc resists deflection during the conditioning of the master cylinder MC for operation thus assisting in its conditioning phase, and subsequently transmitting reactive forces from the master cylinder progressively as the vacuum motor output builds up to give the operator a definite sensing of the relation of his input to the output effort of the motor to the point of power run-out.

The interaction of the control valve CV, power diaphragm PA and the reaction disc 80 produces a novel and patentable arrangement, and features of construction and operation of the cooperating elements of these components and more efficient cooperation of such elements during the opening phase of the control valve CV as depicted in FIGURE 6, to dish the disc into a configuration similar to a "Belleville" washer. The outer peripheral portion 83 of the disc is moved forwardly relatively with respect to the inner marginal portions of its fingers which tends to widen the space 79 normally obtaining between the shoulders 71, 78. This spring-lever action is induced by the substantially stationary condition of the plunger 77 induced by the column of brake fluid under initial pressure. Accordingly, movement of the inner ends of the radial fingers of the disc is less than the peripheral portion thereof. The ratio of this movement is defined by the distances between the inner and outer pressure points with respect to the intermediate fulcrum point shown in light dashed circles on the disc in FIGURE 9. In the illustrated embodiments, the disc ratio is approximately 4:1 and should be increased as the weight of the vehicle increases. As the booster motor VM increases its output in response to continued operator force on the brake-pedal 35, the work is divided between the operator and motor on substantially the same basis as the ratio aforesaid provided by the disc, but as will be appreciated, due to the resilient nature of the disc fingers, the work is not divided proportionally but rather in progressive accord with the respective efforts exerted by the operator and motor to obtain the improved brake-applying results. The action of the balancing disc 80 is to maintain a progressively increasing division of the work between the operator and motor VM so that regulation of the booster motor VM may be smoothly controlled by the control valve CV. Thus, as soon as the power chamber 45 has been sufficiently evacuated of air to set up the required differential pressures on opposite sides of the power member PA in a brake-applying direction to counterbalance opposing forces between the hydraulic piston 20 and motor diaphragm PA, spring 122 immediately induces separation of the valve piston and sleeve in response to slight additional relative movement of the power member PA in a brake-applying direction to "lap" the working land 117 on the valve piston 106 with respect to the control-slot 111 in the valve sleeve 105, so that the opposing forces acting on the power diaphragm PA via the disc 80, and piston 20 are balanced without one overpowering the other. If too little air has been admitted to the power chamber 45, then operator force on the valve sleeve 105 over-powers the power diaphragm PA, causing the control-slot 111 to open sufficiently with respect to the working land 117 on the valve piston 106 to accelerate evacuation of the power chamber 45 into the inlet-manifold (not shown) or other source of negative pressure, until equilibrium is established again. Upon release of pressure on the brake-pedal 35, pressures on opposite sides of the power diaphragm PA are immediately equalized via the open poppet relief valve 197 supplemented by the control-slot 111 connected to atmosphere via the atmospheric valve chamber 121 which enables the master cylinder piston 20, power diaphragm PA and control valve sleeve and piston to return to their respective "off" positions urged by springs 25, 102 and 122 and the disc 80 assuming its normal flat relaxed disposition.

It is therefore, seen that the booster motor VM assists operator force applied on the brake-pedal 35 to operate the brakes of the motor vehicle, and that the control valve means CV controls the motor VM according to operator force applied to the pedal 35 in a predetermined relation to each other defined by the resiliency and leverage ratio of the fingers characterizing the reaction disc 80. Such predetermined relationship being dependent on the length of the disc fingers, their leverage ratio and the resiliency factor, and, the reaction from the hydraulic piston 20 is equal to the sum of the forces exerted jointly by the operator on the brake-pedal 35 and the power diaphragm PA of the motor transmitted concurrently through the reaction disc 80. The disc in the present disclosure is shown flat in its normally relaxed state and requires pressure on the brake-pedal 35 to "dish" it so that its reaction transferal function is operative as depicted in FIGURE 6. However, the "dished" configuration may be incorporated when the disc is produced, and in such case, the disc would be installed relaxed though "cupped" so that when pressure is applied on the brake-pedal 35 the disc would be urged to flatten and then slightly "cup" in the opposite direction at wide open position of the control valve CV. The advantage of prefabricating the disc slightly "cupped" is to increase its resistance to fatigue thereby stabilizing its resiliency to prevent change in pedal characteristics resulting from loss of resiliency when the disc is "cupped" out of a normal flat plane.

*Modified Installation and Operation of Reaction Disc*
(FIGURES 10 AND 11)

Depicted in FIGURES 10 and 11 is a modified construction of the resilient disc 80 which eliminates the lever-action characteristic thereof to transmit thrust and reaction, and wherein parts analogous to those already described are designated by like reference characters distinguished, however, by the suffix "a."

This modified structure comprises: a modified plunger 300 provided with an inner enlarged flanged portion 301 adjacent the power member $PA^a$. This flanged portion is provided with a rearward reduced diameter extension 302 shouldered at 303 to provide a short smaller diameter terminal extension 304 which is pressfitted into a central bore 305 in the thrust plate 55a and rigidly attached to said plate as by swedging the end to fill a tapered surface 306 which defines the right end of the bore 305 as shown in FIGURE 10. A disc 307 is centrally apertured at 308 and mounted on the extension 302 against the flange 301 followed by a spacer collar 309 in that order before assembly of the plunger on the plate 55a whereby the plunger, disc and collar provide a unitary assembly for movement as a unit particularly in an axial direction since the disc may have some degree of looseness rotationally with respect to the extension 302 and collar 309, that is, these elements do not have to be rigidly related with respect to flange 301 and collar 309.

In operation, the resilient characteristic only of the disc 307 is utilized and therefore, the disc serves as a spring devoid of lever-action as employed in the first embodiment (FIGURES 1 and 2). However, the spring-action is created in the disc in the same manner as described previously for tensioning the disc 80 under influence of the force applied to the pedal mechanism $P^a$ via the control valve sleeve 105a, actuatable pins 64a and spring seat member 95a. Accordingly, movement of the pedal to its first dashed line position shown in FIGURE 1 brings about an operated disposition of the vacuum-motor $VM^a$ corresponding to FIGURE 6 wherein the disc 307 has been deformed under tension to apply thrust to the plunger 300 and therefore to the connected power member $PA^a$ in cooperation with the valve return spring 122a to provide a measure of the braking force in effect in accordance with the distance the pedal has been moved, but thereafter, the disc 307 transmits a substantially constant reaction on the pedal due to the stationary condition of the fluid-displacing unit (plunger 300 and hydraulic piston 20a) while applying pressure to the column of non-compressible brake fluid.

Spring 102a may be used to supplement the springaction of the disc 307, and serves a useful purpose of providing resistance to initial pedal movement prior to the disc 307 being deformed so that the pedal has no lost-motion. This modification of my invention contemplates that the disc 307 may be installed under a predetermined tension which would serve to provide resistance to the pedal at the very outset of its movement from normal position, and in such case, the spring 102a could be eliminated thus placing full reliance on the disc 307 for the reaction forces on the pedal in accordance with the distance the pedal moves resulting in simplification of the mechanism.

This modification also may be used with any of the various forms of the discs shown in FIGURES 9A through 9E to change the reaction feel on the pedal to suit the installation and driver preference as is understood.

A further advantage provided by this modified disc installation comes from the softer valve return spring 122a which may be employed since the disc 307 may be sufficiently tensioned to induce the major portion of slack take-up and initial pressurizing of the brake fluid in the master cylinder MC prior to the vacuum-motor VM$^a$ taking over the work of actually applying the vehicle brakes. Also it should be noted that the springy characteristic provided by the disc 307 is more firm at all points of change in stress as against a conventional helically coiled compression spring such as springs 102a and 122a, which characteristic of the disc eliminates the "floating" feel transmitted to the pedal when coiled springs are employed as the sole means of transmitting reaction. Thus this novel disc reactor provides resistance on the pedal very closely simulating hydraulic thrust proportional to the total braking pressure at different stations of pedal depression.

*Rigid-Lever Reaction System and Operation Thereof*
(FIGURES 12, 13, AND 14)

This modified mechanical reaction mechanism generally designated LR may be substituted for the reaction discs 80 or 307, and wherein parts analogous to those already described are designated by like reference characters distinguished, however, by the suffix "b." This lever reaction structure comprises: a modified work-performing element or plunger 315 with its terminal end adjacent the power member PA$^b$ formed as a circular flange or hub 316, preferably having two pairs of diametrically opposed radial-slots 317 at right angles to each other. The bottoms of these slots provide vertical walls 318, and a coaxial blind bore 319 in the end of the hub intersects the inner ends of said slots to separate said slots into four radially disposed slots best shown in FIGURE 13. This bore receives the pilot end 320 of a short plunger or stem 321 having an annular pressure flange 322 medially thereof with the other end 323 of the stem fixed as by swedging in a central bore 324 in the thrust plate 55b whereby the stem 321 and plate move as a unit. Each radial slot receives a reaction lever or arm 325 radially disposed with respect to the axis of the vacuum-motor VM$^b$. These levers are normally fulcrumed at 326 against the vertical walls 318 with their inner ends 327 on the opposite side of the fulcrum point and adapted to be acted on by the pressure flange 322 and their outer ends 328 on the same side as the presure point 322 being engageable by the offset shoulder 99b on the movable spring seat 95b, the latter being slidably disposed on the flange 322. Accordingly, the inner end portions of the levers 325 are operatively disposed between the plunger 315 and plate 55b corresponding to the operating disposition of the aforesaid reaction discs, said levers, however, being devoid of resiliency. End faces 329 of radial segments 330 between the aforesaid radial-slots (see FIGURE 13) are normally contiguous to the confronting face of the flange 322 prior to the levers 325 being positioned as shown in FIGURE 14 to transmit reaction from the master cylinder MC. A ring-type spring seat member 331 having oppositely disposed annular concentric flanges 332, 333, is carried forwardly of the outer ends of the levers 325 on the cylindrical outturned wall 101b of the movable spring seat 95b for receiving reaction from spring 102b as previously explained in connection with the first embodiment (FIGURES 1 and 2). Each of the levers 325 is provided with a cross bore 334 substantially in the same plane as the fulcrum points 326. An arcuate external groove 335 provided in each of the segments 330 in circular alignment with each other, and a split retainer ring 336 having a smaller cross-sectional diameter than the cross bores 334 through the levers, is inserted through these cross bores into engagement with the grooves 335 aforesaid to act as a safety retaining means for the levers in their respective radial-slots 317, and particularly as a means to retain the levers in the slots during assembly of the motor VM$^b$. Thus ring 336 is detachably incorporated in the mechanism to retain the levers in their operating positions within the slots 317 without interfering with the movement of said levers on their fulcrum points 326.

In operation, this novel lever reaction system LR is quite similar to the lever-action of the spring disc 80. With the parts normally disposed as shown in FIGURE 12, the booster mechanism BM$^b$ is fully released (brakes "off") and the segments 330 on the plunger 315 contiguous to the confronting end of flange 322 thereby freeing the levers 325 of pressure. Depression of the pedal to the first dashed line position of FIGURE 1 operates the parts to their relative positions shown in FIGURE 14 wherein the levers have been rotated counterclockwise as viewed in this figure on their fulcrum points 326 by pressure applied to their outer ends via the offset shoulder 99b on the spring seat 95b, the latter being moved leftward from normal position under influence of the pedal as a unit with the pins 64b and the control valve sleeve 105b. This movement of the levers actually converts the fulcrum point 326 to a pressure point, and the inner ends of the levers in engagement with the flange 322 from a pressure point to a fulcrum point if some movement of the plunger 315 occurs whereby the ends of the segments 330 are further separated from the face of the flange 322 prior to the control valve CV$^b$ reaching an operating "on" position to energize the motor VM$^b$. During this relative separation between the plunger 315 and power member PA$^b$ which is accommodated by the yielding of the valve return spring 122b enabling the valve piston 106b to move relatively toward the valve sleeve 105b as the latter is moved forwardly under influence of the pedal. Since the valve spring 122b is capable in its preloaded status of initially moving the fluid-displacing unit (plunger 315 and hydraulic piston 20) to take up the slack in the system and bring about some pressurization of the brake fluid prior to inauguration of the power phase to apply the brakes as demonstrated in FIGURE 14, the reaction levers are not rotated until the master cylinder MC is conditioned for operation in the manner just stated, but as soon as the brake fluid is sufficiently pressurized to arrest movement of the fluid-displacing unit in the master cylinder, rotational movement of the levers 325 is reversed to clockwise fashion by pressure applied on their inner ends by pressure flange 322, thus effecting transmission of proportional reaction from the work element 315 to the power member PA$^b$ in accordance with the division of work performed by the latter member as defined by the leverage-ratio of the levers. Thus, said levers 325 are conditioned to transmit reactive forces from the master cylinder MC in response to initial operation of the pedal to effect separation in the fluid-displacing unit in the manner previously described, whereupon, said levers transmit the division of work performed through the pedal by the operator whereby the total braking effort is proportionally divided between the pedal and power member PA$^b$ until maximum power output has been reached, and thereafter, if additional braking force is desired, said levers are effective to transmit such additional operator effort exerted through the pedal mechanism P upon operating said levers to a position beyond that depicted in FIGURE 14 to take up all of the operating clearance between the working face 143b defining the forward end of the main control valve CV$^b$ and the confronting face on the plate 56b of the power member PA$^b$. In this latter manner, the operating force on the master cylinder MC can be augmented to cooperate with the power-run-out status of the booster mechanism BM$^b$ where greater braking force is required above that which the booster mechanism BM$^b$ is capable of producing to assist operator effort. However, so long as the power developed by the booster motor VM$^b$ is sufficient to effect the required braking application, with the plunger segments 330 separated from the flange 322, it is clear that the lever reaction system transmits pressure from the fluid-displacing unit to the pedal and motor power member PA$^b$ in direct proportion to the leverage-ratio of said reaction levers 325, but under no circumstances can the control valve CV$^b$ be effective to control energization of the booster motor VM$^b$ unless the plunger segments 330 are in spaced relationship with respect to the end face on the flange 322, and, furthermore, this space is never closed during braking assist from the booster motor VM$^b$ or when braking force of greater magnitude than the said motor can produce is effective as when operating the levers to a position beyond that shown in FIGURE 14, to fully take up the operating clearance between the cooperating abutment-engaging face portions aforesaid on the control valve CV$^b$ and power-diaphragm plate 56$b$ wherein the valve control-slot 111 is wide open corresponding to power-run-out of the booster motor VM$^b$. When the levers occupy the fully tilted position disposed forwardly from their non-transmitting position normal to the axis of the power member PA$^b$ corresponding to maximum separation in the fluid-displacing unit, such additional operator effort can now be transmitted to the work element 315 through said levers in cooperation with maximum power output of the motor VM$^b$. In the event of power failure, operator force transmitted through the reaction levers 325 in fully tilted position, is effective to operate the master cylinder MC to apply and release the vehicle brakes in conventional fashion. Thus, it is seen that when power-run-out occurs, the division of work normally effective through the reaction levers between the operator and the booster motor VM$^b$ can be augmented by additional operator force exerted on the levers 325 in fully tilted position, to produce the desired braking effect, and should power failure occur, operator force alone can be applied through said levers in fully tilted position to operate the master cylinder MC.

The above described lever reaction system LR is characterized by two principal operational differences from those of the resilient disc 80 and modification 307 thereof. One of these differences is that the reaction levers are devoid of resiliency which prevents a "straight-through" operation of the master cylinder MC as in the first embodiment (FIGURE 1) by engagement of the extension 74 with the bottom 75 of the blind axial bore 76 in the work-performing element 77, such operation of the master cylinder with the levers must necessarily be effected through the levers alone as the rigid nature of the levers in operating position maintains the extension 74 disengaged from the work element 77. The second difference resides in the proportional division of work provided by the levers between the operator and booster motor VM$^b$ due to their rigidity as contrasted with the resilient characteristic of the discs which transmit a progressively increasing reactive force rather than such force being proportionally apportioned between the driver of the vehicle and booster motor VM$^b$.

Spring 102$b$ may be dispensed with in this modification provided spring 122$b$ is sufficiently preloaded to bring about the slack take-up and conditioning operations of the master cylinder MC to pressurize the brake fluid. However, spring 102$b$ may be utilized to provide resistance to such initial pedal depression so that the operator senses increasing resistance on the pedal during the slack take-up phase of pedal depression from its normal position. Since spring 122$b$ is preferably stronger than spring 25, this latter spring could serve the same purpose as spring 102$b$ and therefore, optionally, installations which utilize the residual pressure valve RV incorporated in a passageway branched from the pressure working cylinder 24 enable the preloaded status of spring 25 to be set as desired since it no longer serves to control the residual valve RV.

This novel lever-reaction system is unique in that it is self-contained and occupies substantially the same space as the previously disclosed reaction plates 80, 307, and especially where reaction proportional to total braking force is desired, it finds special utility in this type of power brake control.

From the foregoing operational description of the reaction-lever system LR it should be manifest that progressive control of motor output is provided; that is to say, the reaction levers 325 insure that the force produced by the power diaphragm PA$^b$ of the motor VM$^b$, which force is dependent upon the degree of vacuum to which the power diaphragm is subjected, is proportional to the operator effort applied to the pedal mechanism P. As the output effort of the motor power member PA$^b$ is transmitted to the fluid-displacing unit, this force reacts through the levers 325 against the spring seat 95$b$ and therefore, against operator effort applied to the brake-pedal, thus providing the operator with a physical perception of the degree to which his own effort is being power-assisted. The reaction is proportionate to the motor output, being governed by the ratio between the fulcrum point 326 and the pressure points at the extremes of the levers on opposite sides of the fulcrum point as is understood. Since the reaction is proportionate, the relation between the input and output efforts is proportionate also. For example, when the force produced by the power member PA$^b$ exceeds the operator input effort, the plunger 315 is moved forwardly by the inner ends of the levers 325. If the physical input effort is maintained constant at this point, the valve piston 106$b$ and power diaphragm PA$^b$ will advance sufficiently to effect a "lapped" condition with respect to the working land 117$b$ and control-slot 111$b$ and thereby hold the brakes "on" due to the operator input and the motor output forces substantially balancing the reacting pressure on the brake fluid against the piston 20. If, on the other hand, the input effort by the operator is reduced causing a corresponding retraction of the control valve sleeve 105$b$ the control-slot 111$b$ would be correspondingly exposed to the atmospheric valve chamber 121$b$ to admit air to the power chamber 45$b$ to enable release of the power diaphragm PA$^b$ toward a substantially corresponding "off" position. Thus, the proportion between the physical input effort and the output effort generated by the motor VM$^b$ is maintained to give a progressive or follow-up control of the motor output.

If the physical input effort exceeds the maximum force that can be exerted by the motor power member PA$^b$ through the reaction levers 325, which condition obtains when the power member is subjected to full vacuum, the control valve sleeve 105$b$ can be brought into engagement with the plate 56$b$ corresponding to wide open position of the control-slot 111$b$. Thereafter, any increase in the input by the operator will not produce corresponding increase in motor assistance, and in consequence operator effort will be transmitted through the levers 325 to the plunger 315 to the fluid-displacing unit in the master cylinder MC, thus supplementing the maximum effort produced by the motor. Under these conditions, the space between the inner ends of the plunger segments 330 and the confronting face of the shoulder 322, would be at a maximum corresponding to full movement of the levers from normal relative positions shown in FIGURE 12 to positions beyond the positions of FIGURE 14 in response to pedal-actuation of the valve sleeve 105$b$ into abutting relationship with the plate 56$b$ forming part of the power-diaphragm PA$^b$.

*Mechanical Coupling Between Power Member and Control Valve Piston and Operation Thereof*

(FIGURES 15 AND 16)

This modification incorporates in the vacuum-motor VM mechanical means for coupling the control valve piston 106 to the power diaphragm plate 56 for axial movement as a unit while accommodating limited relative radial displacement therebetween to avoid critical rigid coaxial relation thereof, and wherein parts analogous to those already described are designated by like reference characters distinguished, however, by the suffix "c".

The structure comprising this novel coupling includes: an integral reduced diameter circular extension 345 which terminates in an annular flange 346 at the inner end of the extension 119c on the control valve piston 106c to provide an annular space 347 therebetween. The confronting end of the opening 68c is closed by a wall 348 provided with a radially disposed opening or slot 349 therethrough slightly wider than the diameter of the extension 345 open at its inner end and, of a length slightly longer than the radius of the opening 68c. Intersecting the perimeter of hole 68c and the inner end of the slot 349 is a circular hole 350 through the plate 56c of slightly larger diameter than the flange 346, the intersected points on the perimeter aforesaid merging with the circumference at the full diameter of the hole 350 provide an opening 351 through the wall encircling the opening 68c to enable the flange 346 to slide into the space 352 between the plate 48c and wall 348 into coaxial disposition with respect to the axis of the power member PA$^c$. To attach the control valve piston 106c including the entire control valve assembly CV$^c$, the flange 346 is inserted through the hole 350 into alignment with the space 352 which places the marginal portions of the slot 349 in line with the space 347. The flange 346 is now ready to be radially moved into coaxial disposition with respect to the opening 68c which when completed disposes the forward end of the control valve piston 106c in engagement with the marginal portion of the slot 349 thereby coupling the control valve assembly CV$^c$ and plate 56c for axial movement as a unit.

It is thus seen that this coupling arrangement enables detachable coupling of the valve piston 106c and power member PA$^c$ to prevent fortuitous axial separation of these two components which enables easy assembly and disassembly of the control valve mechanism CV$^c$ with respect to the pressure-responsive unit PA$^c$, and also insures exactness of the followup action between the valve sleeve 105c and piston 106c at all relative dispositions thereof in controlling the operation of the vacuum-motor VM$^c$ since under no circumstance can the valve piston 106c become separated from the thrust plate 56c.

For a more realistic appraisal of the pedal characteristics required to control my improved vacuum-booster BM, the following test data simulating actual performance conditions when installed in a motor vehicle are believed apropos:

The vacuum-motor VM used in this test incorporated 5 5/17″ diameter power-diaphragm plates, a 20# preloaded valve return spring (122), a 2″ diameter reaction disc (80) having a 5/16″ diameter central aperture, and fabricated as shown in Figure 9A from metallic springy material .030 in. thick with six 7/8″ long radial fingers acting through a 3⅔ to 1 in. leverage ratio to transmit reactive forces from the work-performing element 77 to the power-diaphragm, when energized, and to the valve sleeve (105):

| Pedal pressure: | Hydraulic line pressure |
|---|---|
| 8# pedal effort only | lbs__ 35 |
| 9# pedal effort only | lbs__ 45 |
| 18# vacuum-assist inaugurated | lbs__ 125 |
| Pedal to valve sleeve ratio approximately | 5 to 1 |

Further analyzing the aforesaid pressure comparisons, it is seen that if pedal pressure of 18# results in 125 p.s.i. line pressure, the effective force directly on the valve sleeve (105) is approximately 90# to overcome the 20# valve spring and deform the disc (80) sufficiently to accommodate relative movement of the valve sleeve (105) with respect to the valve piston (106) to enable the power-diaphragm to be energized which condition is shown in the above pressure chart at almost the instant booster assist starts. Accordingly, approximately 70# thrust is exerted through the valve sleeve (105) by the pedal to subject the disc (80) to tension, which reacts at the aforesaid leverage-ratio of 3⅔ to 1 from the power-diaphragm as a factor in part of the resilient characteristic of the disc on the seat member (95) thence to the valve sleeve (105) via pins (95), 5 to 1 linkage to the pedal 35. These reaction forces on the output effort of the vacuum-motor VM are factors of combined lever-action and resiliency characterizing the reaction disc (80) to provide the operator with accurate sensing of the build-up in output effort by the vacuum-motor to smoothly control its action on the master cylinder MC. But, as previously pointed out, the pressure on the pedal may be modulated to meet the most exacting requirements from the standpoint of operator input effort for a given sequence of hydraulic line pressure influenced by the motor VM by merely altering the disc (80) or valve return spring (122) or both to raise or lower the tension characteristic thereof to produce the desired pedal feel. The tension characteristic may be changed by altering the diameter, perforation design, leverage-ratio, thickness, tempering, etc., or combining certain of these specification factors to yield a particular reaction effect as is understood.

From the foregoing description, considered with the various illustrations of the different embodiments of my invention, it will be seen that certain interrelated components of the booster apparatus BM possess similar functional characteristics such that interchangeability is readily effected, particularly in connection with the power controlling features, means for coupling the control valve piston 106 to the power member plate 56 and the vacuum relief check-valve 197.

Also certain components may be eliminated from the structure, such as the vacuum relief valve 197, without rendering the booster apparatus BM inoperative. However, in this latter instance the characteristics of pedal operation are changed to cause the brake-applying control to be modified to such an extent as to be slower or faster and possibly less predictable as to timing and force exerted by the power cylinder in relation to a given pressure on the pedal 35. With reference to the interchangeability of components aforesaid, it should be noted that the movable wall PA may be controlled with substantially equal efficiency by either of the two resilient disc installations shown in FIGURES 2 and 6 respectively, or by the reaction-lever system LR shown in FIGURE 12 with or without the reactive and return spring 102. However, spring 102 serves the important function of apprising the operator of a degree of increasing resistance on the pedal during the critical stage of slack take-up prior to bringing in the power phase thus preventing a lost-motion "feel" during this initial phase of pedal movement attended by possible erratic initial energization of the booster motor VM. It is contemplated that the disc 307 in FIGURE 10 disclosure may be installed under a predetermined tension so that it can serve substantially the same function as just described in connection with spring 102 during the conditioning of the master cylinder MC for operation by the vacuum-motor VM. The control of the power cylinder may be had with the illustrated pendulum-type pedal or other types such as commonly project through the floorboard of the driver's compartment. Reactive and return spring 102 may be eliminated thus placing major reaction control on the resilient disc 80, which would also require possible change in the preloaded status of spring 122 to prevent any tendency of "over-braking" due to lack of progressive resistance on the pedal through the slack take-up movement thereof. Valve return spring 122 has limited operational increase in tension over its preloaded status, and therefore, cannot provide increasing tension on the brake-pedal progressively induced by operation of the latter through its full operating stroke. Hydraulic piston 20 may be integrated with the work-performing element 77, especially where a plunger of less cross-sectional area than the pressure working chamber 24 is employed as the fluid-displacing member. And, of course, the flexible tubular connection 175 between the diaphragm plates 55, 56 and control valve assembly CV may be replaced by other suitable connecting means such as a flexible bellows.

The interchangeable designs of the two reaction disc installations, either of which may be substituted for the other, and the reaction-lever system LR which may be employed in lieu of either of the disc installations, as pointed out above, bear a definite relationship to the functional characteristics of the valve return spring 122, to effect transferal of reactive forces from the master cylinder MC to the pedal mechanism P. This relationship may be summarized as follows:

After the compensating port 27 has been closed in the manner previously described, increased effort on the pedal 35 projects the hydraulic piston 20 farther into the pressure chamber 24 still accompanied by the movable power assembly PA and control valve CV moving as a unit simultaneously with the piston 20 to build-up initial pressure on the brake fluid corresponding substantially to the preloaded status of spring 122 until such pressure reacts on the head of the piston 20 tending to retard movement thereof; whereupon, valve sleeve 105 begins to move relatively to the valve piston 106 as a consequence of the yielding of spring 122. This relative movement of the valve sleeve which is toward the diaphragm plate 56, correspondingly reduces the operating clearance or space between the working face 143 of the valve housing VH with respect to said plate best demonstrated in FIGURE 6, it being recalled that the forward extension 119 on the valve piston 106 projects through the opening 68 into abutting relation with the plate 48 for unison movement of the valve piston and power diaphragm PA under influence of the spring 122. As such relative movement of the valve sleeves continues against spring 122 influenced by operator effort on the pedal 35, the peripheral marginal portion of the reaction disc 80 is deflected forwardly out of plane with respect to the central marginal portion thereof disposed between the shoulders 71, 78 to tension the disc, or in the case of the reaction-levers 325 would rotate them counterclockwise to the position shown in FIGURE 14, prior to or merging substantially with the working land 117 connecting the vacuum valve chamber 118 to the power chamber 45 to energize the power member PA$^b$ as is understood. When such relative movement has progressed sufficiently as demonstrated in FIGURE 6 (disc-action) or FIGURE 14 (lever-action), reaction forces from the work-performing element 77 are transmitted thereby from the shoulder 78 to the offset shoulder 99 on the spring seat 95, pins 64, valve sleeve 105, push rod PR thence through the pedal linkage to the pedal 35 itself to provide the operator with physical perception of the amount of braking force in effect in accordance with motor output. This reaction force is characterized by progressively increasing resistance to pedal movement defined by the tension in the disc 80 and its leverage-ratio if operated in this manner, or in the case of the lever-reaction system LR such reaction force would be proportional to the output total pressure effective on the piston 20. Accordingly, the discs 80 shown in FIGURES 9 through 9E perform the same function as the plurality of levers 325 shown in FIGURE 12, but due to the resilient action of the discs, proportional transferal of reaction from the master cylinder MC is eliminated.

It is important to also note that during "dishing" of the disc 80 or rotation of the levers 325, which is preferably accomplished in part prior to the vacuum-motor VM becoming energized for smooth mergence of the power phase with the operator initiatory phase, the discs 80 and 307 or the levers 325 in conjunction with the spring 122 despite the latter is yielding and therefore increasing its tension above normally preloaded status, transmit force from the pedal mechanism P to additionally pressurize the brake fluid to take up the shoe-to-drum clearance and thus initiate braking action sufficient to cause slight vehicular deceleration to occur before either of the above reaction means becomes effective to transmit the output of said motor to the master cylinder. However, if spring 122 is lightly preloaded, as for example, at 10 to 15#, then this spring is provided with less capacity to transmit thrust before yielding and as a consequence, the motor phase becomes effective in response to less initial pedal travel as is understood. As soon as the pressure on the brake fluid reaches a factor substantially corresponding to the thrust-transmitting capacity of the normal spring-load on the valve sleeve 105, movement of the fluid-displacing unit (hydraulic piston 20) becomes substantially stationary due to the non-compressible column of brake fluid, and, not until this latter condition obtains can the control valve CV be operated relatively as aforesaid to condition the reaction devices 80, 307 or levers 325 to transmit reaction forces from the master cylinder since it is this arrested state of the piston 20 that provides the fulcrum status of the plunger 77 effective for the disc or levers to function as means to transmit reactive forces.

The manually adjustable element 123 against which the valve spring 122 reacts, provides different preloaded settings of said spring so that the degree of shoe-to-drum contact may be varied to provide a soft or moderately hard pedal during the initiatory brake-applying stroke which eliminates the necessity of having to install a new set of spring conditions for each particular pedal "feel" as may be desired by the driving public. Thus, for example, if spring 122 is installed under a preloaded weight of 20#, all that is required to obtain a harder or softer pedal and therefore more or less effective shoe-to-drum contact during the initial phase of the braking action, is to axially adjust the nut 123 relatively to the working land 117 to the extent necessary to obtain the desired reaction from said spring. A shim washer of the proper thickness may be inserted between the valve land 117 and the axially adjusted position of the nut to provide a definite position of the nut for each setting thereof corresponding to the preloaded weight at which the spring is desired to operate.

Reference is now made to the terminology used in the foregoing description and in the appended claims in which the identifying expression and/or terms employed are intended to convey meanings which include the range of reasonable equivalents in the patent sense. For example, the expressions "motor," "power cylinder," "power assembly," "power device," "vacuum-cylinder," "power-booster," "vacuum-booster," "booster mechanism," "power means," "power mechanism," are intended to include any casing and/or chamber having a pressure-responsive movable assembly therein, whether such assembly includes a solid piston or a flexible diaphragm, or some other component serving the same purpose. The terms "front," "rear," "forward," "bottom," "top," "right," "left," and other directional words or characters are intended to have only relative connotation for convenience in describing the structure as illustrated in the drawing, and are not intended to be interpreted as requiring any particular orientation with respect to associated structure external to the present disclosure or the operating position thereof.

Although several embodiments of my invention have been disclosed herein and which are believed well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. A fluid pressure actuated motor comprising: a casing and a pressure-responsive unit movable therein from a normally released position; an operator-operated member having a normally released position; a movable member mounted on said pressure-responsive unit coaxially therewith; follow-up control valve mechanism having a movable portion mounted on the motor casing, and another portion operatively associated with the pressure-responsive unit to move as a unit therewith, said valve mechanism having a normal "off" position balancing pressures in said motor and being movable relatively from such "off" position to establish differential pressures in said motor; normally spaced engageable portions mounted respectively on the pressure-responsive unit and said valve portions for defining the limits of relative operating movement of the latter; the improvement which comprises: a work-performing element acted on in part by said pressure-responsive unit; a reaction and force-transmitting device including a normally relaxed resilient member having lever-action operably disposed between said work element and pressure-resposive unit in engagement with said movable member; mechanical means for transmitting force from said operator member to move said movable member to inaugurate tension in said resilient member by deforming it prior to energization of said motor whereby the latter when energized causes the reaction from said work element to be transmitted through said resilient member under increasing tension on the operator member while the pressure-responsive unit operates through a predetermined power range defined by minute separation of the work element and pressure-responsive unit induced when placing said resilient member under tension as aforesaid; a link for transmitting force from said operator member to move one of the valve portions relatively with respect to the other portion from "off" position; and a normally preloaded spring operably reacting between said valve portions for biasing them apart and accommodating their movement toward each other from "off" position under influence of said operator member operated from released position.

2. A fluid pressure actuated motor according to claim 1 plus another normally preloaded spring operably disposed in said motor between a stationary portion of the casing and said movable member for biasing the latter to normal disposition against said pressure-responsive unit, said last-named spring being characterized by progressively increasing tension induced in accordance with the distance the operator member is operated from released position.

3. A fluid pressure actuated motor according to claim 2 including a longitudinal passageway through said pressure-responsive unit for normally balancing pressures on opposite sides thereof when open; a valve seat terminating one end of the passageway; a valve element movably disposed in said passageway and having an end complemental portion engageable by said valve seat to close said passageway; a reduced diameter extension projecting from the end portion of said valve element through the passageway into engagement normally with said movable member in normal disposition to disengage the valve end portion from the seat thereby opening said passageway to counterbalance pressures on opposite sides of the pressure-responsive unit; and a normally preloaded spring having a portion attached to the pressure-responsive unit and another portion engaging the end portion of the valve element to urge the latter toward seated position in response to movement of the movable member from its normal position whereby the said motor is conditioned for differential pressures to be effective on opposite side of the pressure-responsive unit under control of the valve mechanism as aforesaid.

4. A fluid pressure actuated motor according to claim 2 plus mechanical means for detachably coupling the other portion of the valve mechanism to the pressure-responsive unit for axial movement as a unit and to accommodate limited relative radial displacement thereof with respect to each other at all points along the axial movement of the valve mechanism.

5. A fluid pressure actuated motor comprising: a casing and a pressure-responsive unit movable therein from a normally released position; an operator-operated member having a normally released position; a movable member mounted on said pressure-responsive unit coaxially therewith; follow-up control valve mechanism having a movable portion mounted on the motor casing, and another portion operatively associated with the pressure-responsive unit to move as a unit therewith, said valve mechanism having a normal "off" position balancing pressures in said motor and being movable relatively from such "off" position to establish differential pressures in said motor; normally spaced engageable portions carried respectively by the pressure-responsive unit and said valve portions for defining the limits of relative operating movement of the latter; the improvement which comprises: a work-performing element acted on in part by said pressure-responsive unit; a reaction and force-transmitting device including a normally relaxed resilient member with one portion fixed on the work element and a spaced portion engaging said movable member; mechanical means for transmitting force from the operator member to move said movable member thereby inaugurating tension in said resilient member which progressively increases in direct proportion to the distance the operator member is operated from released position induced by the substantially stationary status of the work element in consequence of the work-load resistance thereagainst, such increasing pressure reaching a substantially constant factor at such stationary condition of the work element; a link for transmitting force from the operator member to move one of the valve portions relatively with respect to the other valve portion from "off" position; and another normally preloaded spring operably reacting between said valve portions for biasing them apart and accommodating their movement toward each other from "off" position under influence of the said operator member operated from released position.

6. A fluid pressure actuated motor comprising: a casing and a pressure-responsive unit movable therein from a normally released position; an operator-operated member having a normally released position; a movable member mounted on said pressure-responsive unit coaxially therewith; follow-up control valve mechanism having a movable portion mounted on the motor casing, and another portion operatively associated with the pressure-responsive unit to move as a unit therewith, said valve mechanism having a normal "off" position balancing pressures in said motor and being movable relatively from such "off" position to establish a differential pressures in said motor; normally spaced engageable portions carried respectively by the pressure-responsive unit and said valve portions for defining the limits of relative operating movement of the latter; the improvement which comprises: a work-performing element acted on in part by said pressure-responsive unit; reaction and force-transmitting means having a plurality of pivoted levers disposed radially with respect to the axis of said motor, and adapted to provide a mechanical connection between the pressure-responsive unit and movable member aforesaid, said work element serving as a fulcrum for said levers to define the ratio of reaction transmission from the work element to said pressure-responsive unit and said movable member; a link for transmitting force from the operator member to move one of said valve portions from "off" position as a unit with said movable member relatively with respect to said pressure-responsive unit and other valve portion; and a normally preloaded spring operably reacting between said valve portions for biasing them apart and accommodating their movement toward each other from "off" position under influence of said operator member operated from released position.

7. A pressure fluid operated servo-motor including a casing in which a movable power assembly is actuatable by a pressure differential on opposite sides thereof, said power assembly dividing the interior of said casing into a constant pressure chamber and a variable pressure chamber, a source of pressure different from atmosphere, and an operator-operated member having a normally released position, the improvement which comprises: an element movable to perform work under influence in part of said power assembly normally engaged directly therewith, said element being characterized by relative and conjoint movement with respect to said assembly, opposed by a normally preloaded spring; a telescopic mechanical connection for normally effecting direct coaxial engagement between said work-performing element and said assembly, said connection being adapted to accommodate limited relative movement of said work performing element with respect to said assembly to axially separate them; a predetermined space normally obtaining between said work-performing element and assembly when engaged as aforesaid; reaction mechanism comprising a plurality of reaction levers offset from the axis of said assembly and normally ineffective to transmit reaction, said levers being characterized by power and operator pressure points defined by their extreme inner and outer ends respectively with limited portions thereof extending radially outwardly from their extreme inner ends disposed in said space aforesaid, to provide intermediate fulcrum points in engagement with said work-performing element, and portions on the said assembly in engagement with the power pressure points respectively on said levers to enable the latter to effect said relative separation of the work-performing element and assembly accompanied by proportional enlargement of the space aforesaid in response to operating said levers from normally ineffective position; control valve mechanism having at least two principal cooperating elements adapted to have operative follow-up association with said power assembly, said valve elements being relatively displaceable from normal disposition wherein pressures are balanced in said servomotor chambers for power-inactivation of said servomotor, to an operating "on" disposition to establish differential pressures in said servomotor chambers for power-activation of said servomotor, relative displacement of said valve elements being induced upon reaction from said work-performing element reaching a pre-determined magnitude, under operator-actuation; another mechanical connection between the extreme outer ends of said reaction levers and said one valve element to activate the same conjointly under influence of said operator member acting directly on the latter valve element against reaction from said work-performing element, and thereby effect relative displacement of said valve elements accompanied by the aforesaid axial separation of the work element and assembly with consequent proportional enlargement of the said space normally there-between, and actuation of the reaction levers to reaction-transmitting position during a predetermined servomotor output range effective during axial separation of the work element and assembly; normally spaced engageable portions operatively associated respectively with said assembly and one valve element, and between said valve elements, to define the aforesaid relative separation and displacement of said work-performing element and assembly, and the valve elements respectively, the portions between said one valve element and assembly, when engaged, effecting "straight-through" operator-actuation of said assembly and work-performing element; and spring means including a normally preloaded expansion spring operatively disposed in said variable pressure chamber of the servomotor to react between its casing and extreme outer ends of said reaction levers, said expansion spring being characterized by progressively increasing reaction on said operator member via said reaction levers connected to said one valve element, to oppose relative displacement of said one valve element with respect to the other valve element, in accordance with the distance the operator member is operated from released position.

8. A servomotor constructed in accordance with claim 7 wherein said cooperating valve elements comprise respectively an outer sleeve, a portion of which projects through a central aperture in the motor casing and is slidably supported thereby, and provided with a port having a flexible connection to said source and a spaced control port communicating with said variable pressure chamber via said fluid connection, and an inner piston slidably mounted in said outer sleeve and provided with an annular sealing land spaced from an annular working land, said lands defining a ring-like vacuum chamber therebetween in constant communication with said first-named port with said working land being adapted to control said control port to place said control valve in its "off" and "on" positions aforesaid to control power-inactivation and power-activation respectively of said servomotor.

9. A servomotor constructed in accordance with claim 7 plus a normally open passageway through said power assembly to establish equivalent pressures in said servomotor chambers; an annular valve seat terminating one end of said passageway; a movable relief valve element cooperating with said seat to control the open and closed condition of said passageway; a normally preloaded spring carried by said pressure-responsive assembly for urging the said relief valve element on to its seat to close said passageway thereby placing said variable pressure chamber subject to the "on" position of said valve mechanism to vary the pressures therein to produce differential pressures on opposite sides of said power assembly for power-activation of said servomotor; and an extension on said relief valve element projecting through said passageway oppositely to said annular seat in normally engaging relation with respect to the said member movable in unison with said one valve element to maintain said passageway open while said valve mechanism is in "off" position.

10. A servomotor constructed in accordance with claim 7 plus mechanical means for detachably coupling the other valve element of said valve mechanism to said power assembly for axial movement together and accommodate limited relative radial displacement therebetween.

11. A servomotor constructed in accordance with claim 7 plus a threaded cylindrical extension on the other valve element; a manually adjustable abutment on said threaded extension for receiving reaction from one end of said valve spring with the other end thereof reacting on a portion fixed on said one valve element whereby the preloaded tension on said valve spring is selectively establishable in accordance with the manually adjusted position of said abutment on said threaded extension.

12. A servomotor constructed in accordance with claim 7 wherein said reaction levers are characterized by rigidity whereby said reactive forces transmitted thereby from said power assembly to said operator-operated link are proportional.

13. A servomotor constructed in accordance with claim 7 wherein said reaction levers are integral to produce a centrally apertured circular disc characterized by resiliency and which assumes a deformed dished configuration when said spatial separation of the thrust-transmitting member and power assembly is effected.

14. A servomotor constructed in accordance with claim 13 wherein said disc is perforated radially to facilitate dishing with the peripheral marginal portion thereof bearing on said member movable in unison with the said one valve element and the marginal portion encircling said aperture is adapted to engage said fulcrum and pressure points on said power assembly.

15. A servomotor constructed in accordance with claim 7, plus a normally preloaded spring operably disposed between said valve element to bias them apart to normal disposition in cooperation with said spring means.

16. A servomotor constructed in accordance with claim 15 in which said valve spring is characterized by a normally preloaded strength of such magnitude that initial operator force is transmittable thereby to move said control valve in normal disposition simultaneously with said power assembly and work-performing element to positions whereat reaction induces said spring to yield and thereby accommodate relative displacement of said valve elements to operating "on" position under increased operator-actuation.

17. A servomotor constructed in accordance with claim 7 wherein said telescopic mechanical connection comprises: an axial bore open at one end and closed at the other in said work-performing element; a pilot shaft coaxially fixed at one end on said power assembly with the other end projecting into said axial bore to normally engage the closed end thereof.

18. A servomotor constructed in accordance with claim 17 wherein said predetermined space is defined by confronting annular surface portions at the open end of said work-performing element and on the power assembly respectively, said portions being concentrically disposed with respect to the axis of said pilot shaft.

19. A servomotor constructed in accordance with claim 7 wherein said last-mentioned mechanical connection comprises: a cup-shaped movable member having a vertical wall terminating at its periphery into a horizontal cylindrical wall; means supporting said movable member in coaxial disposition with respect to said power assembly, for relative sliding movement with respect to said assembly and normally disposed in engagement therewith, to establish said assembly in normally released position under influence of said expansion spring; a plurality of movable elements projecting through said assembly in airtight sealed relation to interconnect said one valve element with the vertical wall of said movable member, for movement as a unit; and a like number of surface portions on the cylindrical wall adapted to engage said operator pressure points respectively on the outer ends of said reaction levers to operate the same from said normally ineffective positions to reaction-transmitting positions.

20. In booster-type fluid pressure activated servomotors having a fluid chamber enclosure and a movable wall dividing said chamber into opposing fluid pressure chambers, a source of pressure different from atmosphere, a control valve normally spring loaded within and adapted to selectively control communication of said source and atmospheric pressure with said pressure chambers in such manner that substantially equivalent pressures are establishable in said chambers for power-inactivation of said servomotor, and a pressure differential is producible within said chambers for power-activation of said servomotor, an operator operated member for actuating a portion of said control valve in opposition to increasing spring load therein, the improvement which comprises: a work-performing element movable simultaneously with and relatively to said movable wall; reaction mechanism operatively incorporated between said movable wall and work-performing element to react on said operator member, the normal disposition of said mechanism being ineffective to transmit reaction from the work-performing element to said operator member; and a mechanical connection between portions of said mechanism and control valve effective to operate said mechanism simultaneously therewith from normal disposition to reaction-transmitting disposition in response to relative movement of said work-performing element with respect to said movable wall under operator-actuation of said control valve prior to the latter becoming effective to control power-activation of said servomotor.

21. In booster-type fluid pressure activated servomotors having a fluid chamber enclosure and a movable wall dividing said chamber into opposing fluid pressure chambers, a source of pressure different from atmosphere, a control valve normally spring loaded within and adapted to selectively control communication of said source and atmospheric pressure with said pressure chambers in such manner that substantially equivalent pressures are establishable in said chambers for power-inactivation of said servomotor, and a pressure differential is producible within said chambers for power-activation of said servomotor, an operator-operated member for actuating a portion of said control valve in opposition to increasing spring load therein, the improvement which comprises: a work-performing element movable simultaneously with and relatively to said movable wall; reaction mechanism operatively incorporated between said movable wall and work-performing element to react on said operator member, the normal disposition of said mechanism being ineffective to transmit reaction from the work performing element to said operator member; a mechanical connection between portions of said mechanism and control valve effective to operate said mechanism simultaneously therewith from normal disposition to reaction-transmitting disposition in response to relative movement of said work performing element with respect to said movable wall under operator-actuation of said control valve prior to the latter becoming effective to control power-activation of said servomotor; and means defining the relative movement of said work-performing element, said means including normally spaced engageable portions on said movable wall and control valve effective when engaged to transmit operator force directly to said movable wall to move said work-performing element simultaneously therewith.

22. In booster-type fluid pressure activated servomotors having a fluid chamber enclosure and a movable wall dividing said chamber into opposing fluid pressure chambers, a source of pressure different from atmosphere, a control valve normally spring loaded within and adapted to selectively control communication of said source and atmospheric pressure with said pressure chambers in such manner that substantially equivalent pressures are establishable in said chambers for power-inactivation of said servomotor, and a pressure differential is producible within said chambers for power-activation of said servomotor, an operator-operated member for actuating a portion of said control valve in opposition to increasing spring load therein, the improvement which comprises: a work-performing element normally engageable with and movable relatively to said movable wall; reaction-transmitting mechanism operatively incorporated between said movable wall and work element, said mechanism including a pressure area on said portion of the control valve acted on by said operator member, another pressure area on said movable wall radially spaced from the first-named pressure area, a fulcrum area provided on the work element intermediate said pressures areas and axially spaced therefrom, and a plurality of reaction members contiguously disposed with respect to the said two pressure areas and fulcrum area when the work element is normally engaging the movable wall wherein said reaction members are ineffective to transmit reaction from said work element; an operative connection between said portion of the control valve and reaction members adapted to displace the latter at an angle with respect to said two pressure areas and said fulcrum area in response to operator-actuation thereof relatively to the movable wall whereby the work element and said movable wall are biased apart, thus rendering said reaction members effective to transmit reaction from said work element to said portion of the control valve under operator-actuation prior to said control valve becoming effective to control power-activation of said servomotor.

No references cited.

UNITED STATES PATENT OFFICE
CERTIFICATE OF CORRECTION

Patent No. 3,072,106

January 8, 1963

Glenn T. Randol

It is hereby certified that error appears in the above numbered patent requiring correction and that the said Letters Patent should read as corrected below.

Column 2, line 69, for "radically" read -- radially --; column 9, line 56, after "spring" insert -- seat --; column 11, line 37, for "PH" read -- VH --; column 12, line 58, for "a" read -- the --; column 13, line 1, for "projection" read -- projecting --; column 18, line 2, after '"dishing"' insert a comma; column 19, line 38, for "105" read -- 80 --; column 32, line 5, for "(95)" read -- (64) --; column 36, line 48, strike out "a"; column 37, line 52, for "there-between" read -- therebetween --; column 38, line 40, for "together" read -- as a unit --.

Signed and sealed this 15th day of December 1964.

(SEAL)
Attest:

ERNEST W. SWIDER
Attesting Officer

EDWARD J. BRENNER
Commissioner of Patents